(12) United States Patent
Ichiyama et al.

(10) Patent No.: US 9,124,740 B2
(45) Date of Patent: Sep. 1, 2015

(54) REPRODUCTION OF TOUCH OPERATION IN INFORMATION PROCESSING APPARATUS

(71) Applicant: KONICA MINOLTA, INC., Chiyoda-ku (JP)

(72) Inventors: Shohei Ichiyama, Toyokawa (JP); Yoichi Kurumasa, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/551,682

(22) Filed: Nov. 24, 2014

(65) Prior Publication Data

US 2015/0156352 A1 Jun. 4, 2015

(30) Foreign Application Priority Data

Nov. 29, 2013 (JP) ................................. 2013-247582

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ....... *H04N 1/00392* (2013.01); *H04N 1/00381* (2013.01); *H04N 1/00405* (2013.01); *H04N 2201/0094* (2013.01)

(58) Field of Classification Search
CPC .. G06K 15/02; G06F 3/1297; H04N 1/00392; H04N 1/00381; H04N 1/00405
USPC ......................................... 358/1.1, 1.15, 1.13
See application file for complete search history.

(56) References Cited

U.S. PATENT DOCUMENTS

| | | | |
|---|---|---|---|
| 2005/0275638 A1 | 12/2005 | Kolmykov-Zotov et al. | |
| 2008/0163130 A1 | 7/2008 | Westerman | |
| 2008/0178126 A1 | 7/2008 | Beeck et al. | |
| 2011/0273380 A1 | 11/2011 | Martin | |
| 2013/0286435 A1 | 10/2013 | Anezaki et al. | |
| 2014/0145997 A1* | 5/2014 | Tiruvuru ........................ | 345/174 |
| 2014/0354605 A1* | 12/2014 | Kurita ........................... | 345/179 |

FOREIGN PATENT DOCUMENTS

| | | |
|---|---|---|
| EP | 1462920 A2 | 9/2004 |
| JP | 2000-235549 A | 8/2000 |
| JP | 2008-040560 A | 2/2008 |

OTHER PUBLICATIONS

European Search Report issued May 12, 2015 in corresponding European Patent Appln. No. 14194913.1 (8 pages).

* cited by examiner

*Primary Examiner* — Douglas Tran
(74) *Attorney, Agent, or Firm* — Buchanan Ingersoll & Rooney PC

(57) ABSTRACT

An information processing apparatus includes a display unit displaying a screen which accepts a touch operation on the information processing apparatus, a touch operation unit accepting the touch operation, a touch event issuance unit issuing one or more touch events respectively corresponding to one or more touch operations on the touch operation unit, and a gesture control unit capable of performing each of a mode for performing corresponding processing based on the one or more touch events issued by the touch event issuance unit, and a reproduction mode for reproducing the touch event stored beforehand. The gesture control unit is configured to add an operation image indicating the touch operation corresponding to the stored touch event, to a region associated with the touch event in the reproduction mode, and to cause the display unit to display the operation image.

20 Claims, 23 Drawing Sheets

REPRODUCTION OF TOUCH OPERATION IN INFORMATION PROCESSING APPARATUS

This application is based on Japanese Patent Application No. 2013-247582 filed with the Japan Patent Office on Nov. 29, 2013, the entire content of which is hereby incorporated by reference.

BACKGROUND OF THE INVENTION

1. Field of the Invention

The present disclosure relates to control of an information processing apparatus, and more particularly, to reproduction of a touch operation in an information processing apparatus which can accept the touch operation.

2. Description of the Related Art

Concerning display of an operation on an apparatus, for example, Japanese Laid-Open Patent Publication No. 2008-040560 discloses a "history display apparatus capable of displaying history information such as an operation performed on an apparatus without losing sight of any continuous operation".

Further, Japanese Laid-Open Patent Publication No. 2000-235549 discloses a technique for "allowing a movement of a mouse or the like performed by an operator to be reproduced later in another terminal such that the same result can be obtained at the time of reproduction".

SUMMARY OF THE INVENTION

According to the technique disclosed in Japanese Laid-Open Patent Publication No. 2008-040560, in order to display history information such as an operation performed on an apparatus without losing sight of any continuous operation, when an operation history is generated, an operation position image indicating the position of an operated operation portion can be displayed on an image of the operation portion in time sequence, along a path connecting two adjacent operation portions, with a predetermined display interval. However, when the technique is applied to, for example, a gesture operation, there is a problem that a trajectory cannot be displayed because the gesture operation is a continuous operation and two points are close to each other.

Further, according to the technique disclosed in Japanese Laid-Open Patent Publication No. 2000-235549, an input event of a mouse (such as a mouse click, mouse movement, or the like) and a result event (such as generation of a window, update of a pointer position, or the like) can be stored, and the stored events can be issued. However, the mouse is always displayed on a personal computer, whereas there is no mouse in an image formation apparatus. Thus, there is a problem that merely generating an input event would not allow a user to understand where on a panel the input event has been generated.

Further, in another aspect, a method for reproducing the same operation content as that at the time of storage by storing a touch event and regenerating and issuing the stored touch event is conceivable as means for reproducing an operation content of an image formation apparatus. By using this method, the content operated by the user, such as a touch operation, a gesture operation, or the like, can be completely reproduced. However, since a touch event is generated inside the image formation apparatus when the touch event is automatically reproduced, the user cannot understand which key is pressed and what type of operation is performed. Thus, it is required to allow the user to easily understand coordinate values of a touched point and the content of an operation (for example, a flick operation or the like).

Therefore, a technique for solving problems as described above is needed. The present disclosure has been made to solve the aforementioned problems, and one object of the present disclosure is to provide an information processing apparatus which allows a touched point and an operation content to be easily understood. Another object of the present disclosure is to provide a method for controlling an information processing apparatus to allow a touched point and an operation content to be easily understood. Still another object of the present disclosure is to provide a program for causing a computer to perform the above method.

An information processing apparatus in accordance with one embodiment includes: a display unit configured to display a screen which accepts a touch operation on the information processing apparatus; a touch operation unit configured to accept the touch operation; a touch event issuance unit configured to issue one or more touch events respectively corresponding to one or more touch operations on the touch operation unit; and a gesture control unit configured to be capable of performing each of a mode for performing corresponding processing based on the one or more touch events issued by the touch event issuance unit, and a reproduction mode for reproducing the touch event stored beforehand. The gesture control unit is configured to add an operation image indicating the touch operation corresponding to the stored touch event, to a region associated with the touch event in the reproduction mode, and to cause the display unit to display the operation image.

According to another embodiment, a method for controlling an information processing apparatus is provided. The method includes: displaying a screen which accepts a touch operation on the information processing apparatus; accepting the touch operation; issuing one or more touch events respectively corresponding to the one or more touch operations; and performing each of a mode for performing corresponding processing based on the issued one or more touch events, and a reproduction mode for reproducing the touch event stored beforehand. Performing includes adding an operation image indicating the touch operation corresponding to the stored touch event, to a region associated with the touch event in the reproduction mode, and displaying the operation image.

According to still another embodiment, a non-transitory computer-readable recording medium storing a program for causing a computer to perform a method for controlling an information processing apparatus is provided. The program causes the computer to perform: displaying a screen which accepts a touch operation on the information processing apparatus; accepting the touch operation; issuing one or more touch events respectively corresponding to the one or more touch operations; and performing each of a mode for performing corresponding processing based on the issued one or more touch events, and a reproduction mode for reproducing the touch event stored beforehand. Performing includes adding an operation image indicating the touch operation corresponding to the stored touch event, to a region associated with the touch event in the reproduction mode, and displaying the operation image.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
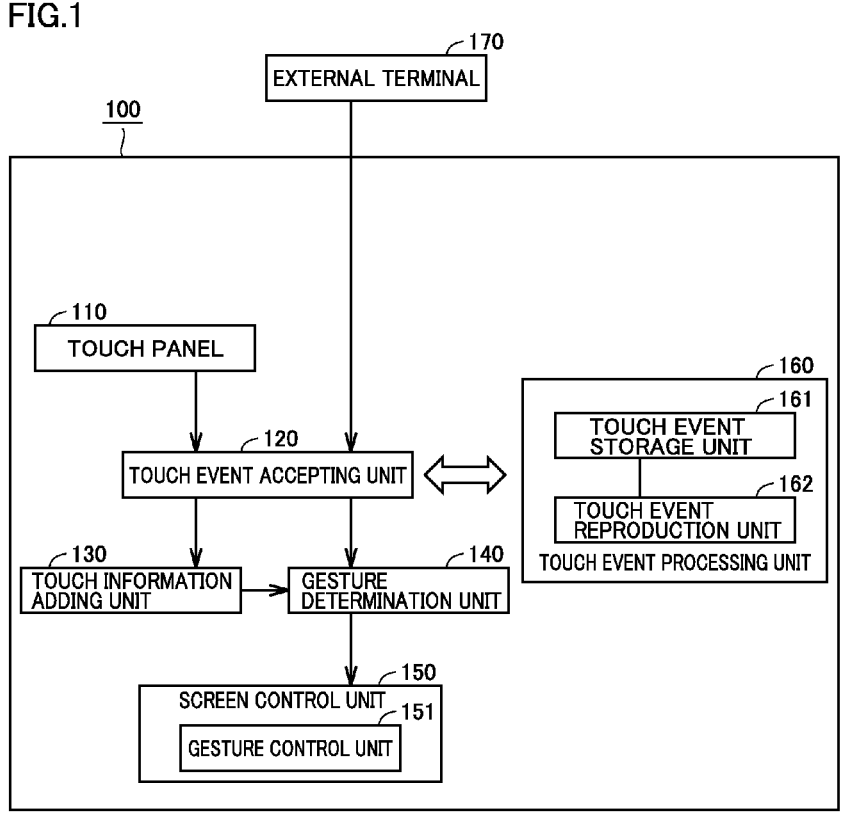
FIG. 1 is a block diagram showing functions implemented by an image formation apparatus 100 in accordance with an embodiment of the present invention.

Hereinafter, an embodiment of the present invention will be described with reference to the drawings. In the description below, identical parts will be designated by the same reference numerals. Since their names and functions are also the same, the detailed description thereof will not be repeated.

First, one aspect of an image formation apparatus as one mode of an information processing apparatus will be described. In an aspect, an image formation apparatus is connected to a remote terminal located at a distant place, and information for instructing an operation method is transmitted from the connected remote terminal to the image formation apparatus. Thereby, the image formation apparatus can synthesize and display the information for instructing the operation method. It is conceivable to synthesize the information for instructing the operation method (for example, a circular mark, an arrow, an image of a hand, or the like) transmitted by an operator from the remote terminal. In this case, however, when operation method instruction information for instructing a multi-touch operation is transmitted from the remote terminal to the image formation apparatus, a user who is looking at an operation content reproduced on the image formation apparatus cannot understand to what extent the operation should be performed, because the user cannot understand a time taken to actually perform a gesture operation, as well as the strength and the direction of the gesture operation.

Further, when an instruction for enlargement is given twice from the remote terminal to the image formation apparatus, the enlargement factor in response to the second instruction is set to be greater than the enlargement factor in response to the first instruction, by a predefined magnitude. Thus, the image formation apparatus cannot faithfully reproduce the content of the operation performed in the remote terminal.

Further, in another aspect, it is conceivable that, when remote operation support is performed, a panel operation by an operator at a help desk is corrected to convert a movement specific to the operator into an appropriate movement. This is displayed continuously on an operation panel as an animation, by interpolating an operation screen in accordance with an operation time, between a first operation screen and a second operation screen, as an operation support screen from a first operation position (i.e., an operation start position) to a second operation position (i.e., an operation finish position) by an operation supporter. Only information at the time of starting a touch (first coordinate values) and information at the time of finishing the touch (second coordinate values) are transmitted from the remote terminal to the image formation apparatus, and the image formation apparatus cannot specify a gesture operation. This is because coordinate values when a touch operation is started, coordinate values while the touch operation continues, and coordinate values when the touch operation is finished are required to specify a gesture. Therefore, in this aspect, the content of the operation by a user is corrected with the coordinate values while the touch operation continues being excluded, which results in a content different from the content actually operated by the user.

An example will be given below.

(Example in Case of Pinch Gesture)

When one of two fingers touching an operation panel moves, the image formation apparatus determines the movement as a pinch gesture, and when the image formation apparatus detects that the finger gradually moves and the movement thereof is stopped for a certain predefined time, or when one of the fingers is lifted off the panel, the image formation apparatus determines that a gesture operation is finished.

The image formation apparatus sets coordinate values of the finished position as the second coordinate values, and interpolates between the first coordinate values and the last coordinate values (second coordinate values) (i.e., displays an animation of the content of the gesture operation by synthesizing an interpolating image).

When this process is applied, the operation content cannot be faithfully reproduced. In addition, when a finger is lifted while an image is being enlarged during a pinch gesture, enlargement of the image should be finished at a position where the finger is lifted, but the position is determined as a gesture finish position when the finger is lifted, and thus interpolation between a start position and the finish position is performed.

That is, there occurs a problem that, when a pinch gesture is performed at the time of reproduction, the content of a pinch gesture operation of an interpolated version is successively synthesized on a main body panel after the gesture is finished, and thus the operation content cannot be faithfully reproduced and visualized.

Therefore, a technique is required which allows the user to easily recognize coordinate values of a touched point and the content of an operation (such as a flick operation, a pinch operation, or the like), in a case where the image formation apparatus or any other information processing apparatus automatically reproduces a touch event based on a touch operation from the user. Accordingly, an image formation apparatus 100 in accordance with the embodiment of the present invention has a configuration as described below.

[Configuration of Image Formation Apparatus 100]

Referring to FIG. 1, image formation apparatus 100 in accordance with the embodiment of the present invention will be described. FIG. 1 is a block diagram showing functions implemented by image formation apparatus 100 in accordance with the embodiment of the present invention. Hereinafter, image formation apparatus 100 is used as an example of an information processing apparatus to which the technical idea of the present invention is applied. However, the technical idea is not limited to be applied to image formation apparatus 100. The technical idea in accordance with the present invention is applicable to any information processing apparatus including at least a touch panel, such as a tablet terminal, a touch-panel type computer, and the like.

In an aspect, image formation apparatus 100 includes a touch panel 110, a touch event accepting unit 120, a touch information adding unit 130, a gesture determination unit 140, a screen control unit 150, and a touch event processing unit 160. Screen control unit 150 includes a gesture control unit 151. Touch event processing unit 160 includes a touch event storage unit 161 and a touch event reproduction unit 162. An external terminal 170 is connectable to image formation apparatus 100 in a wireless or wired manner. The manner of wireless connection is not particularly limited, and for example, WiFi (Wireless Fidelity) or any other method may be used.

Image formation apparatus 100 has an operational mode for storing a touch operation (hereinafter referred to as a touch event), and an operational mode for reproducing the touch operation.

Touch panel 110 accepts an input of an instruction to image formation apparatus 100. The input instruction is transmitted to touch event accepting unit 120, together with data for identifying touch panel 110.

In another aspect, external terminal 170 accepts an input of an instruction to image formation apparatus 100, as with touch panel 110. The input instruction is transmitted to touch event accepting unit 120, together with data for identifying external terminal 170.

Touch event accepting unit 120 transmits the given instruction and the data for identifying touch panel 110 or external terminal 170 which has given the instruction, to touch event processing unit 160.

In an aspect, touch event processing unit 160 stores data transmitted from touch event accepting unit 120 in touch event storage unit 161. In another aspect, touch event processing unit 160 reads out the stored data.

(At Time of Storing Touch Event)

More specifically, when the operational mode of image formation apparatus 100 is set to the operational mode for storing a touch event, touch event storage unit 161 holds data corresponding to the input instruction and the data for identifying touch panel 110 or external terminal 170, as a touch event.

(At Time of Reproducing Touch Event)

On the other hand, when the operational mode of image formation apparatus 100 is set to the operational mode for reproducing the touch event, touch event reproduction unit 162 reads out data stored in touch event storage unit 161, and reproduces the touch event.

Touch information adding unit 130 adds information such as a color, an image, or the like to the touch operation given to touch panel 110 or external terminal 170, and thereby visualizes the touch event such that a user can understand at which location in touch panel 110 or external terminal 170 the touch event has occurred.

Gesture determination unit 140 determines whether or not a gesture can be displayed, based on the type of screen in touch panel 110 or external terminal 170, and data indicating the touch event based on the touch operation. More specifically, gesture determination unit 140 accepts data indicating the type of screen from touch event accepting unit 120, and determines, based on the data, whether or not the screen displayed on touch panel 110 or external terminal 170 is a screen which can display a gesture.

When the displayed screen can display a gesture, gesture determination unit 140 transmits the touch event accepted from touch event accepting unit 120, and data indicating a gesture (also referred to as a "gesture event"), to screen control unit 150.

Screen control unit 150 controls display of the screen in image formation apparatus 100, based on the touch event transmitted from touch event accepting unit 120 and the information associated with the touch event. Gesture control unit 151 can perform each of a normal mode for performing corresponding processing based on one or more touch events and a reproduction mode for reproducing a touch event stored beforehand. In an aspect, gesture control unit 151 adds an operation image indicating a touch operation corresponding to the stored touch event, to a region associated with the touch event in the reproduction mode, and causes the operation image to be displayed in a display region of touch panel 110. In another aspect, gesture control unit 151 causes the operation image to be displayed in the display region of touch panel 110, together with an image indicating the result of processing by the touch event, in the reproduction mode.

More specifically, when image formation apparatus 100 is in an operational mode which allows display of an animation of a gesture based on the touch operation, gesture control unit 151 generates data in which an animation showing a gesture is reflected, by adding information (a mark, an arrow, any other image, or a color) for displaying an animation to the touch event.

Using such data, screen control unit 150 causes the animation showing the gesture to be displayed in the display region of touch panel 110 or external terminal 170. The user of image formation apparatus 100, when looking at the animation, can recognize the touch operation performed on image formation apparatus 100 as the gesture of image formation apparatus 100.

Figure 2:
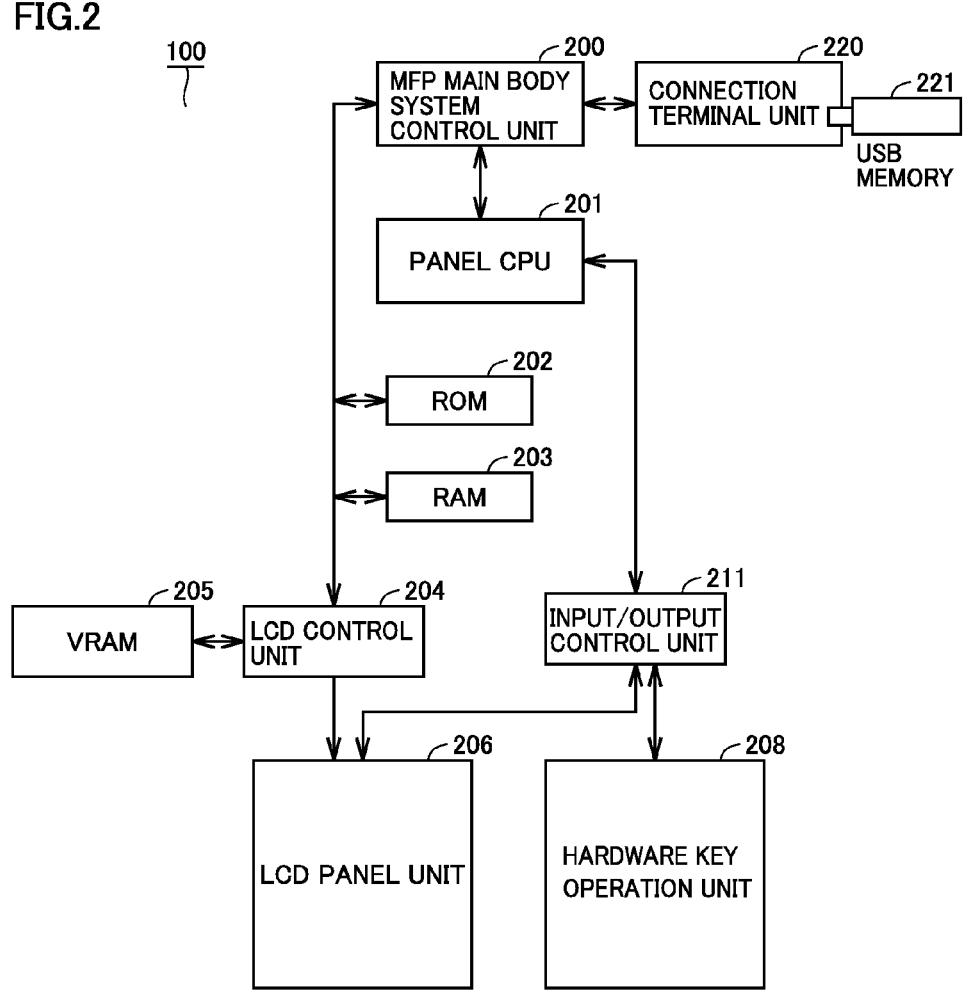
FIG. 2 is a view showing an example of a hardware configuration of image formation apparatus 100 in accordance with the embodiment of the present invention.

Referring to FIG. 2, the configuration of image formation apparatus 100 will be further described. FIG. 2 is a view showing an example of a hardware configuration of image formation apparatus 100 in accordance with the embodiment of the present invention. Image formation apparatus 100 includes an MFP (Multi-Functional Peripheral) main body system control unit 200, a panel CPU (Central Processing Unit) 201, an ROM (Read-Only Memory) 202, an RAM (Random Access Memory) 203, an LCD (Liquid Crystal Display) control unit 204, a VRAM (Video Random Access Memory) 205, an LCD panel unit 206, a hardware key operation unit 208, an input/output control unit 211, and a connection terminal unit 220. LCD panel unit 206 includes touch panel 110.

As shown in FIG. 2, each component is electrically connected to other components. A USB (Universal Serial Bus) memory 221 can be inserted in connection terminal unit 220.

MFP main body system control unit 200 controls an operation of image formation apparatus 100. MFP main body system control unit 200 is implemented, for example, by a controller, a processor, or any other device configured to perform each processing of image formation apparatus 100.

Panel CPU 201 communicates with MFP main body system control unit 200. Panel CPU 201 controls an operation of touch panel 110. More specifically, panel CPU 201 transmits, based on a signal output by a touch operation on touch panel 110, an instruction designated by the touch operation to MFP main body system control unit 200. Based on the instruction, MFP main body system control unit 200 controls the operation of image formation apparatus 100. For example, based on a touch operation, MFP main body system control unit 200 changes the scaling factor of enlargement or reduction for copying, or changes setting of single-sided copying or double-sided copying. In another aspect, panel CPU 201 communicates with input/output control unit 211.

ROM 202 holds control programs and data which define the operation of image formation apparatus 100. RAM 203 temporarily holds data generated in image formation apparatus 100.

LCD control unit 204 performs read/write control of VRAM 205. LCD control unit 204 controls display of an image in LCD panel unit 206. LCD control unit 204 reads out image data stored in ROM 202 as data for displaying an image, and temporarily writes the image data in VRAM 205. LCD control unit 204 reads out the image data from VRAM 205, and transmits the image data to LCD panel unit 206. LCD panel unit 206 displays an image based on the image data. Examples of the displayed image include a screen for accepting an input of a set value for copying by image formation apparatus 100, a screen for setting a destination of an image scanned by image formation apparatus 100, and the like.

LCD panel unit 206 detects a touched position in the display region, and transmits information indicating the position (for example, coordinate values) to input/output control unit 211. Using the information, input/output control unit 211 specifies which function on the screen is selected, and transmits data indicating the function to panel CPU 201. Based on the data, panel CPU 201 performs setting in touch panel 110. Panel CPU 201 transmits data after setting to MFP main body system control unit 200. Based on the signal, MFP main body system control unit 200 controls the operation of image formation apparatus 100.

Hardware key operation unit 208 includes hardware keys, an LED (Light Emitting Diode) or any other light emitting device indicating the state of image formation apparatus 100, and an audio output unit for notifying that an input has been performed on a hardware key or LCD panel unit 206. The hardware keys include, for example, a start key, a numeric keypad, a panel reset key, and the like. The audio output unit is implemented, for example, by a buzzer, a loudspeaker, or the like.

Hardware key operation unit 208 is controlled by input/output control unit 211. In an aspect, hardware key operation unit 208 communicates with MTF main body system control unit 200 via input/output control unit 211 and panel CPU 201, in response to depression of the start key (not shown).

Connection terminal unit 220 detects insertion of USB memory 221, and transmits a detection result to MFP main body system control unit 200. When USB memory 221 is appropriately inserted in connection terminal unit 220, data can be transmitted and received between USB memory 221 and image formation apparatus 100.

[Appearance]

Figure 3:
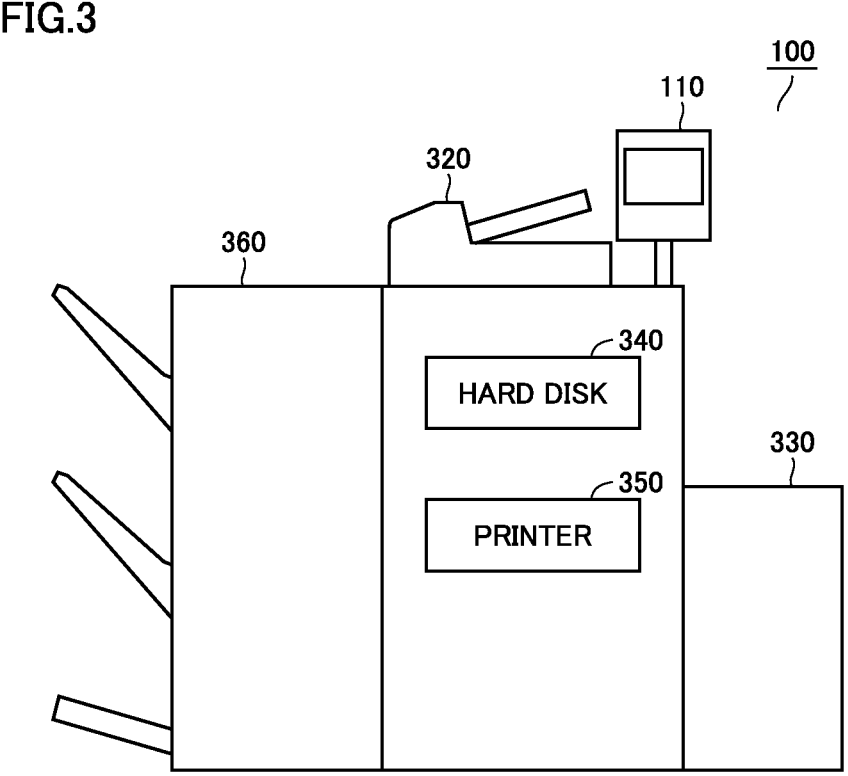
FIG. 3 is a view schematically showing image formation apparatus 100 to which the technical idea in accordance with the present invention is applied.

Referring to FIG. 3, image formation apparatus 100 will be further described. FIG. 3 is a view schematically showing image formation apparatus 100 to which the technical idea in accordance with the present invention is applied. Image formation apparatus 100 includes touch panel 110, an ADF (Auto Document Feeder) 320, a sheet feeding tray 330, a hard disk 340, a printer 350, and a post-processing device 360.

Touch panel 110 accepts an input of an instruction to image formation apparatus 100, based on a touch operation by the user. The type of touch panel 110 is not particularly limited.

ADF 320 is, for example, an automatic document feeding device which reads a moving image of each document. Sheet feeding tray 330 is, for example, an external, large-capacity feeding device. Hard disk 340 stores programs and data for operating image formation apparatus 100, and data generated in image formation apparatus 100 or data input into image formation apparatus 100.

Printer 350 forms an image on a sheet, based on a touch operation given to touch panel 110, using data held in hard disk 340, the RAM, or any other storage device. It is noted that an output of image formation apparatus 100 is not limited to be performed on a sheet, and, in another aspect, image formation apparatus 100 may output data including a scanned image.

Post-processing device 360 performs predefined post-processing on the sheet output from printer 350. It is noted that the hardware of image formation apparatus 100 is well known. Therefore, the detailed description of the hardware will not be repeated.

[Manner of Usage]

Figure 4:
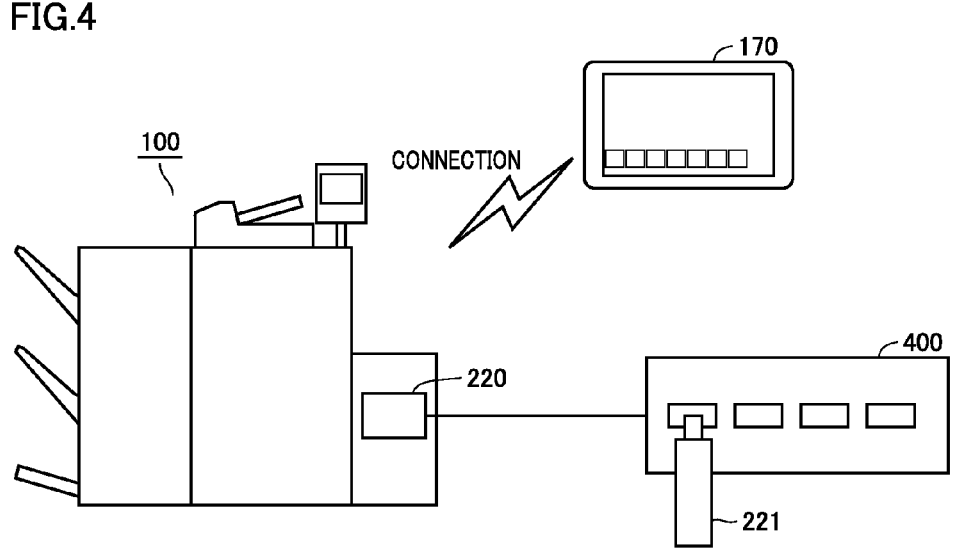
FIG. 4 is a view showing a state where image formation apparatus 100 in accordance with the embodiment of the present invention is connected with other apparatuses.

Referring to FIG. 4, a manner of using image formation apparatus 100 will be described. FIG. 4 is a view showing a state where image formation apparatus 100 in accordance with the embodiment of the present invention is connected with other apparatuses. In an aspect, image formation apparatus 100 is wirelessly connected with external terminal 170. Examples of wireless methods include WiFi (Wireless Fidelity), infrared ray communication, Bluetooth (registered trademark), and the like, and any other wireless method may be used. Image formation apparatus 100 further includes connection terminal unit 220. A USB hub 400 may be connected to connection terminal unit 220. Memory 221 may be inserted in USB hub 400.

When image formation apparatus 100 is wirelessly connected with external terminal 170, external terminal 170 functions as an operation unit for giving an instruction to image formation apparatus 100, as with touch panel 110.

[Touch Event]

Figure 5:
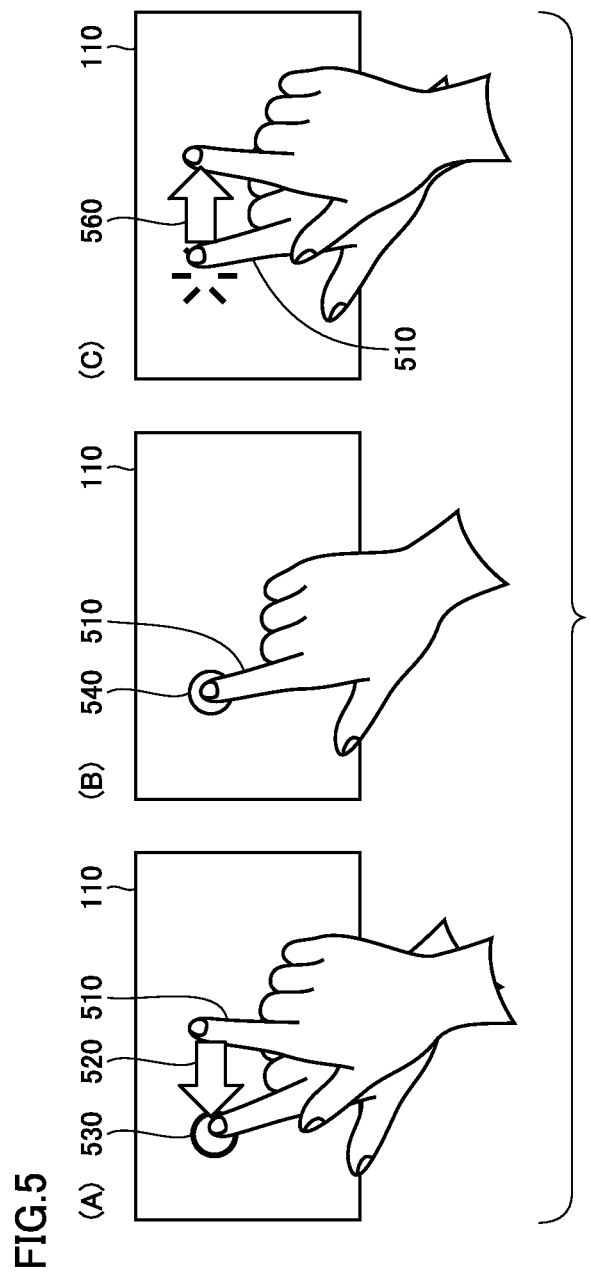
FIG. 5 is a view showing various types of touch events in image formation apparatus 100 in accordance with the embodiment of the present invention.

Referring to FIG. 5, a touch event will be described. FIG. 5 is a view showing various types of touch events in image formation apparatus 100 in accordance with the embodiment of the present invention. In an aspect, the touch events include a press, a move, and a release.

(1) A "press" is an event which occurs when the user of image formation apparatus 100 touches the screen of touch panel 110 with a finger 510 (state (A)). More specifically, the user moves finger 510 which has been away from touch panel 110, in a direction indicated by an arrow 520, and touches a region 530 on touch panel 110. On this occasion, a "press" occurs as a touch event in region 530.

(2) A "move" is an event which occurs in a state where the user touches the screen of touch panel 110 with finger 510. That is, a "move" is a state where touch panel 110 is kept pressed. More specifically, when finger 510 is in contact with a region 540 of touch panel 110, a "move" occurs as a touch event (state (B)).

(3) A "release" is an event which occurs when the user lifts the finger touching the screen. For example, when finger 510 in contact with touch panel 110 is lifted off touch panel 110 in a direction indicated by an arrow, a "release" occurs as a touch event (state (C)).

It is noted that, although the above touch events are illustrated in the present embodiment, the touch event to which the technical idea in accordance with the present embodiment is applied is not limited to those illustrated above.

[Gesture Determination]

Figure 6:
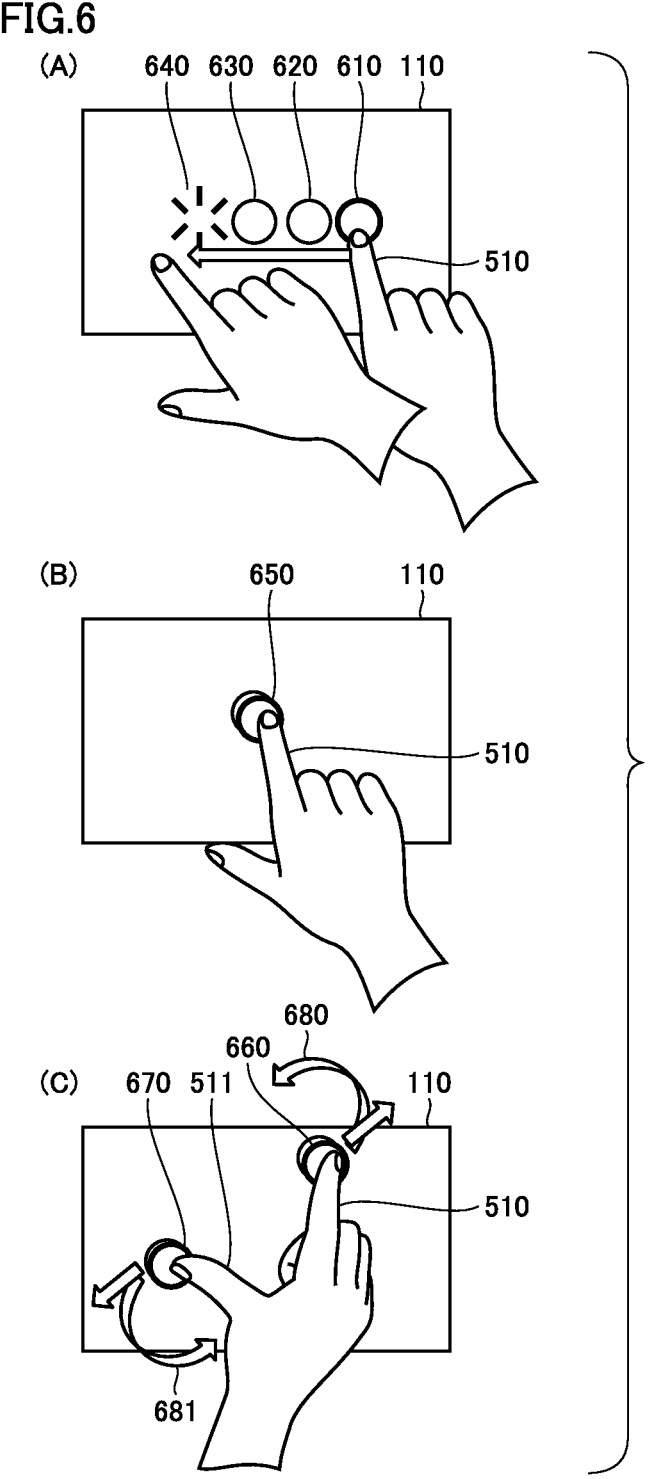
FIG. 6 is a view showing operations on a touch panel 110 included in image formation apparatus 100 in accordance with the embodiment of the present invention.

Referring to FIG. 6, gesture determination in image formation apparatus 100 will be described. FIG. 6 is a view showing operations on touch panel 110 included in image formation apparatus 100 in accordance with the embodiment of the present invention.

(State A)

In an aspect, the user of image formation apparatus 100 touches an operation screen of touch panel 110. For example, the user touches a region 610 with finger 510. Image formation apparatus 100 detects that a touch event (i.e., a press) has occurred. The user slides finger 510 on the operation screen of touch panel 110 toward a direction indicated by an arrow (i.e., a move). For example, the user slides finger 510 from region 610 through a region 630 to a region 640 (i.e., a move), and lifts finger 510 off touch panel 110 at region 640 (i.e., a release). When a time taken from the press to the release is longer than a predefined time, that is, when a time taken to perform a series of operations including the press, the move, and the release in this order is longer than a predefined time, gesture determination unit 140 specifies a drag gesture as the gesture (operation) of image formation apparatus 100.

On the other hand, when the time taken to perform the series of operations is shorter than the predefined time, gesture determination unit 140 specifies a flick gesture as the gesture of image formation apparatus 100.

(State B)

In another aspect, when the user continues pressing touch panel 110 with finger 510 for a predetermined time, gesture determination unit 140 specifies a long tap gesture as the gesture of image formation apparatus 100. In another aspect, when the user performs a series of operations including a touch, a release, a touch, and a release in this order in a predetermined time, gesture determination unit 140 specifies a double tap gesture as the gesture of image formation apparatus 100.

(State C)

In still another aspect, when the user performs an operation of touching regions 660, 670 of touch panel 110 with two fingers 510, 511 (i.e., a press), moving fingers 510, 511 in directions indicated by arrows (i.e., a move), and thereafter stopping movement of fingers 510, 511, gesture determination unit 140 detects from the operation that a two-point touch gesture is started. When there is a change in coordinate values of either one of fingers 510, 511 in the state of the move, gesture determination unit 140 detects that touch panel 110 is in a state where the two-point touch gesture is performed thereon. Screen control unit 150 performs enlargement or rotation, based on the coordinate values when the two-point touch gesture is started, and current coordinate values.

[Gesture Determination]

Figure 7:
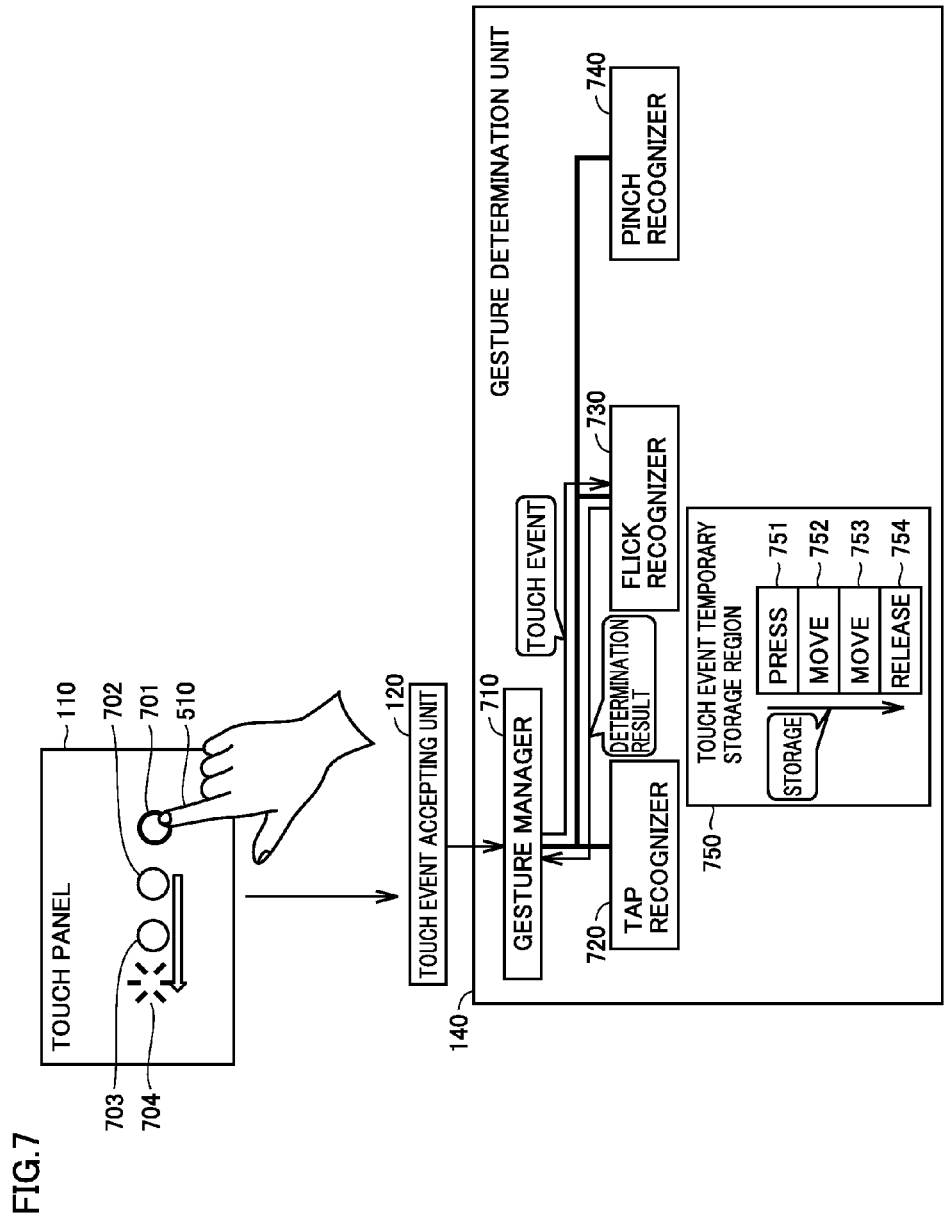
FIG. 7 is a view showing a configuration of a gesture determination unit 140 in accordance with the embodiment of the present invention.
Figure 8:
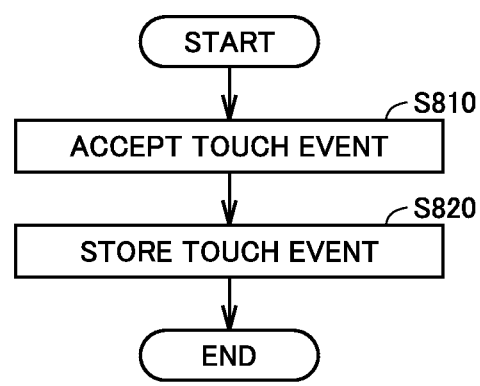
FIG. 8 is a flowchart illustrating processing for storing a touch event.

Referring to FIGS. 7 and 8, the gesture determination in image formation apparatus 100 in accordance with the present embodiment will be described. FIG. 7 is a view showing a configuration of gesture determination unit 140 in accordance with the embodiment of the present invention. FIG. 8 is a flowchart illustrating processing for storing a touch event.

As shown in FIG. 7, in an aspect, gesture determination unit 140 is connected to touch panel 110 via touch event accepting unit 120. Gesture determination unit 140 includes a gesture manager 710, a tap recognizer 720, a flick recognizer 730, a pinch recognizer 740, and a touch event temporary storage region 750. An output of gesture manager 710 is input into at least one of tap recognizer 720, flick recognizer 730, and pinch recognizer 740.

In the present embodiment, for example, a flick gesture is recognized as described below. On touch panel 110, the user of image formation apparatus 100 touches a region with finger 510 (a press 701). The user performs an operation of sliding finger 510 to the left (moves 702, 703). Thereafter, the user lifts finger 510 off touch panel 110 (a release 704).

An output from touch panel 110 is input into touch event accepting unit 120. More specifically, a signal indicating an operation of finger 510 on touch panel 110 (for example, press 701, moves 702, 703, release 704) is input into touch event accepting unit 120. The signal includes coordinate values of a point detected on touch panel 110, transition of the coordinate values indicating a moving direction of the point, and the like. Touch event accepting unit 120 functions as an interface between touch panel 110 and gesture determination unit 140. Touch event accepting unit 120 converts the output from touch panel 110 into a format suitable for processing in gesture determination unit 140, and transmits a converted signal to gesture determination unit 140.

In gesture determination unit 140, gesture manager 710 specifies the type of the touch event on touch panel 110, based on the output signal from touch event accepting unit 120. In accordance with the specified type, gesture manager 710 transmits a signal to either one of tap recognizer 720, flick recognizer 730, and pinch recognizer 740. The recognizer which has received the signal determines the content of the signal (transition of the coordinate values and the like), and determines whether or not a predetermined gesture (for example, a flick) has occurred.

In one embodiment, gestures that can be performed are registered beforehand in image formation apparatus 100. Hereinafter, a case where a flick gesture is registered as an acceptable gesture will be illustrated. In this case, a flick recognition function (flick recognizer) is defined for a region in which a flick operation can be performed on touch panel 110 (hereinafter also referred to as a "flickable region"). The flick recognizer recognizes a flick operation based on an output signal from touch panel 110. In an aspect, the flick recognizer is implemented, for example, by a processor included in touch panel 110 or image formation apparatus 100 performing recognition processing. In another aspect, a configuration for implementing the flick recognition function may be implemented by a circuit element or any other hardware.

In an aspect, flick recognizer 730 writes each signal in touch event temporary storage region 750. More specifically, flick recognizer 730 writes data based on press 701 in a region 751. The data may include coordinate values of a point where contact is detected on touch panel 110, a time at which the contact is detected, and the like.

Thereafter, flick recognizer 730 writes data detected when move 702 is performed, in a region 752. The data includes coordinate values of each contact point detected during move 702. Further, flick recognizer 730 writes data detected when move 703 is performed, in a region 753. The format of the data written in region 753 is the same as that of the data written in region 752.

Flick recognizer 730 determines whether or not a flick gesture has occurred on touch panel 110, using the data stored in touch event temporary storage region 750. In the example of FIG. 7, at a time point when flick recognizer 730 receives the data stored in region 751, flick recognizer 730 does not determine that a flick gesture has been performed. When flick recognizer 730 receives all the data stored in regions 751 to 754, flick recognizer 730 determines that a flick gesture has occurred on touch panel 110. Flick recognizer 730 transmits a determination result to gesture manager 710.

In the present embodiment, tap recognizer 720, flick recognizer 730, and pinch recognizer 740 are registered in accordance with a screen corresponding to each function of image formation apparatus 100. For example, when a setting screen for implementing a function of image formation apparatus 100 (for example, copying) accepts only a flick gesture, only flick recognizer 730 is registered in gesture determination unit 140. That is, only the function of flick recognizer 730 is set to be effective (active).

In another aspect, when a flick gesture and a two-point touch operation are effective on a setting screen for implementing another function of image formation apparatus 100 (for example, scanning), flick recognizer 730 and pinch recognizer 740 are registered in gesture determination unit 140. That is, the function of flick recognizer 730 and the function of pinch recognizer 740 are set to be effective.

Referring to FIG. 8, in step S810, touch event accepting unit 120 accepts a touch event based on an output signal from touch panel 110.

In step S820, gesture manager 710 specifies the type of the detected touch event based on an output from touch event accepting unit 120. Gesture manager 710 stores the touch event via the recognizer corresponding to the specified type. For example, when gesture manager 710 specifies flick recognizer 730, flick recognizer 730 stores data of the touch event in touch event temporary storage region 750.

[Storage of Touch Event]

Figure 9:
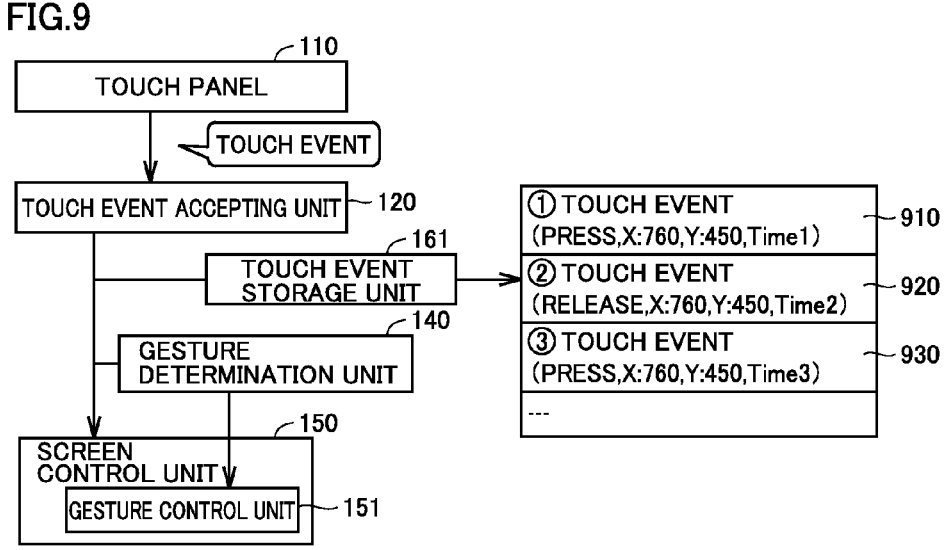
FIG. 9 is a view showing a configuration included in image formation apparatus 100 in accordance with the embodiment of the present invention in order to store a touch event.

Referring to FIG. 9, storage of a touch event will be described. FIG. 9 is a view showing a configuration included in image formation apparatus 100 in accordance with the embodiment of the present invention in order to store a touch event.

In an aspect, touch panel 110 accepts a touch operation by the user of image formation apparatus 100, and outputs a signal corresponding to the accepted touch operation as a touch event. The touch event output from touch panel 110 is accepted by touch event accepting unit 120.

In an aspect, the touch event output from touch event accepting unit 120 is stored in touch event storage unit 161. For example, touch event storage unit 161 stores a touch event in each of regions 910 to 930. In region 910, data indicating a first touch event is stored. Specifically, the data includes the type of a touch operation (press), coordinate values (X:760, Y:450) of a point where the touch is detected, and a time taken from when storage of the touch operation is started to when the touch event (press) is detected (Time 1). In region 920, data indicating a second touch event is stored. Specifically, the data includes the type of a touch operation (release), coordinate values (X:760, Y:450) of a point where the touch is detected, and a time taken from when storage of the touch operation is started to when the touch event (release) is detected (Time 2). In region 930, data indicating a third touch event is stored. Specifically, the data includes the type of a touch operation (press), coordinate values (X:760, Y:450) of a point where the touch is detected, and a time taken from when storage of the touch operation is started to when the touch event (press) is detected (Time 3).

The touch event output from touch event accepting unit 120 is input into gesture determination unit 140. Gesture determination unit 140 specifies the type of a gesture in a manner shown in FIG. 7. Data indicating the gesture specified by gesture determination unit 140 is input into gesture control unit 151. On the other hand, data indicating the touch event output from touch event accepting unit 120 is also input into screen control unit 150.

Gesture control unit 151 controls display of the gesture, based on the result of the determination by gesture determination unit 140, and the data of the touch event.

[Reproduction of Touch Event]

Figure 10:
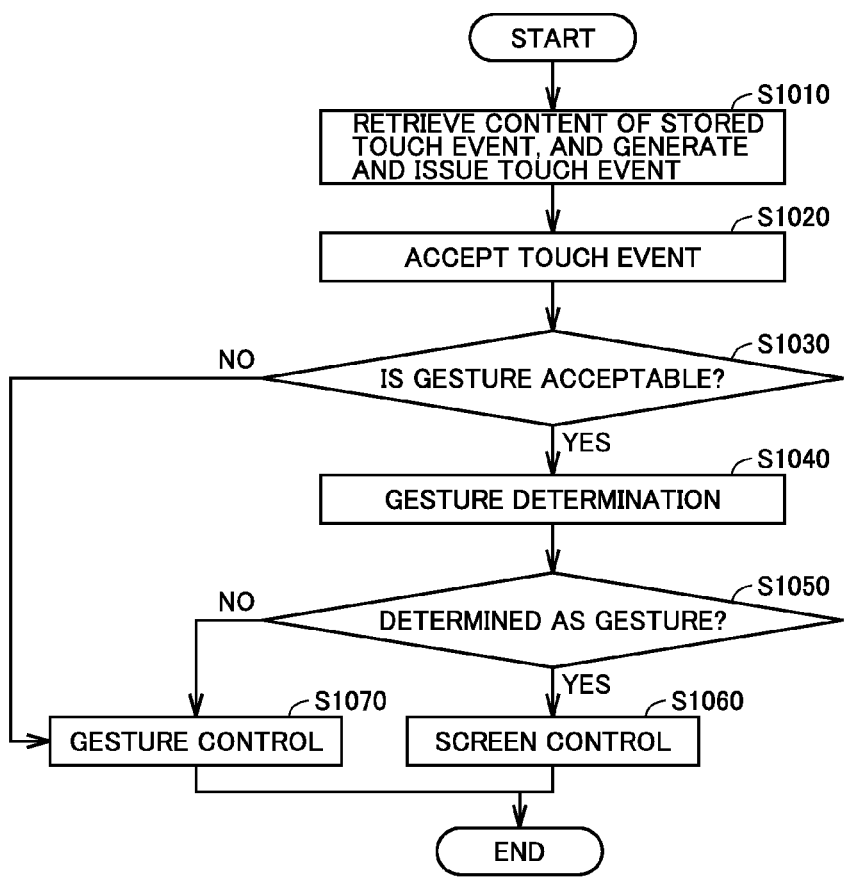
FIG. 10 is a flowchart illustrating a portion of processing performed by image formation apparatus 100 in accordance with the embodiment of the present invention.

Referring to FIG. 10, reproduction of a touch event in image formation apparatus 100 will be described. FIG. 10 is a flowchart illustrating a portion of processing performed by image formation apparatus 100 in accordance with the embodiment of the present invention. The processing is performed by MFP main body system control unit 200, for example when an instruction to reproduce a touch event is given to image formation apparatus 100.

In step S1010, MFP main body system control unit 200 reads out data stored in touch event storage unit 161, and generates a touch event and issues the touch event to screen control unit 150.

In step S1020, MFP main body system control unit 200 accepts a touch event given to touch panel 110.

In step S1030, MFP main body system control unit 200 determines whether or not a gesture corresponding to an operation by the user is acceptable, based on the operational mode of image formation apparatus 100. When MFP main body system control unit 200 determines that the gesture is acceptable (YES in step S1030), MFP main body system control unit 200 switches control to step S1040. Otherwise (No in step S1030), MFP main body system control unit 200 switches control to step S1070.

In step S1040, MFP main body system control unit 200 performs gesture determination, and specifies the gesture of image formation apparatus 100 corresponding to a touch operation.

In step S1050, MFP main body system control unit 200 determines whether or not the touch event accepted in step S1020 is specified as a gesture to be performed by image formation apparatus 100. When MFP main body system control unit 200 determines that the touch event is specified as the gesture (YES in step S1050), MFP main body system control unit 200 switches control to step S1060. Otherwise (NO in step S1050), MFP main body system control unit 200 switches control to step S1070.

In step S1060, MFP main body system control unit 200 performs gesture control in image formation apparatus 100, based on the gesture specified in step S1040. In an aspect, MFP main body system control unit 200 causes the gesture to be displayed in the display region of touch panel 110, as gesture control unit 151. The gesture is, for example, a demonstration of an operation corresponding to a series of operations registered by the user in image formation apparatus 100.

In step S1070, MFP main body system control unit 200 performs screen control, based on the touch event accepted in step S1020. In an aspect, MFP main body system control unit 200 performs screen control in accordance with the touch event, as screen control unit 150.

[Reproduction of Event]

Figure 11:
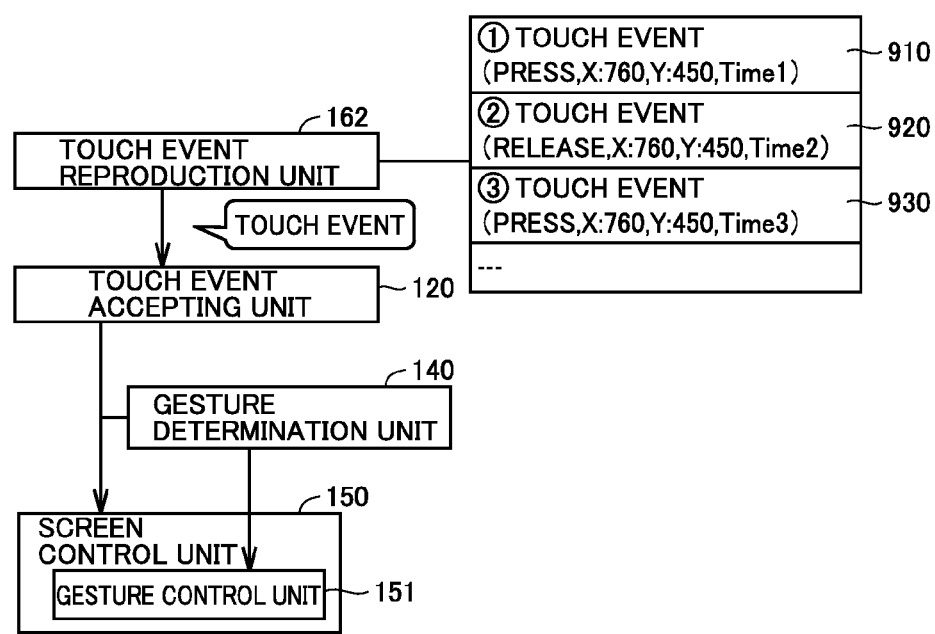
FIG. 11 is a view showing processing for reproducing a touch event.

Referring to FIG. 11, the reproduction of a touch event will be described. FIG. 11 is a view showing processing for reproducing a touch event.

In an aspect, processing for reproducing a touch event is implemented by the user giving an instruction for reproduction to image formation apparatus 100. When the instruction to reproduce a touch event is given to touch panel 110, the instruction is accepted by touch event accepting unit 120 and transmitted to touch event processing unit 160. In touch event processing unit 160, touch event reproduction unit 162 reads out data about the stored touch event from touch event storage unit 161. Examples of the data to be read out are shown in FIG. 9.

Touch event reproduction unit 162 generates a touch event using the read-out data. For example, in the example shown in FIG. 11, touch events including a press, a release, and a press may be generated. Touch event reproduction unit 162 transmits data which specifies the generated touch event to touch event accepting unit 120, and thereby issues the touch event to touch event accepting unit 120. Touch event accepting unit 120 transmits the data to screen control unit 150. Using the data, screen control unit 150 controls the operation of image formation apparatus 100, such as screen transition, change in setting, and the like.

In an aspect, in a case where the screen of image formation apparatus 100 is a screen which can accept a gesture operation, gesture determination unit 140 determines a gesture, using the touch event accepted by touch event accepting unit 120. For example, a plurality of touch events (in regions 910 to 930) generated and issued by touch event reproduction unit 162 are used to determine a gesture (i.e., to specify the type of a gesture). When gesture determination unit 140 specifies the gesture from the touch event, gesture determination unit 140 transmits the specified result to gesture control unit 151. Based on the result, gesture control unit 151 performs display control of the gesture on touch panel 110, as the demonstration of the operation of image formation apparatus 100.

[Storage and Reproduction of Touch Operation]

Figure 12:
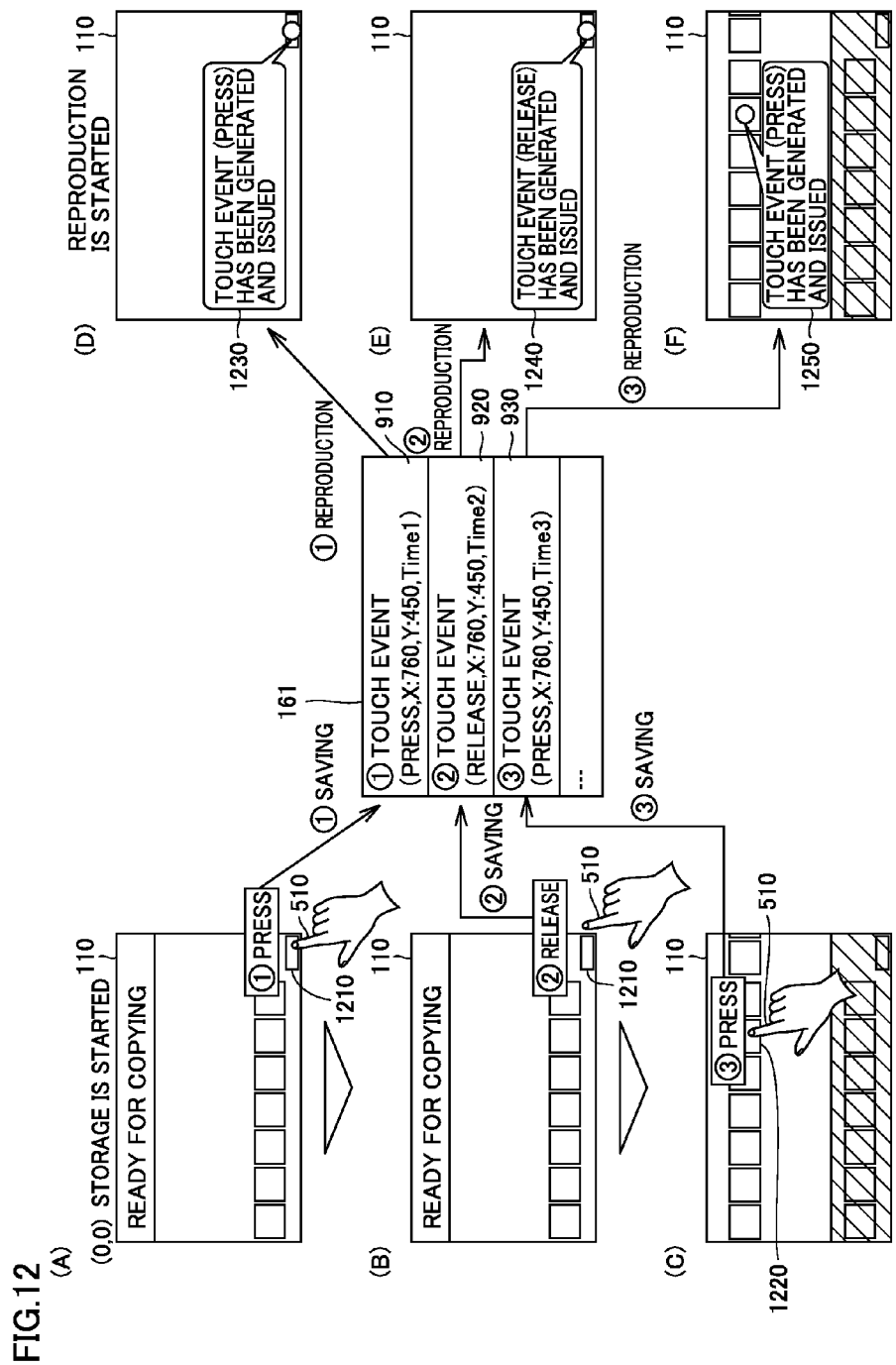
FIG. 12 is a view showing transition of a screen of touch panel 110.

Referring to FIG. 12, a description will be given of a case where the operation performed on image formation apparatus 100 is only a touch operation. FIG. 12 is a view showing transition of the screen of touch panel 110. States (A) to (C) show transition of the screen displayed when image formation apparatus 100 stores touch events. States (D) to (F) show transition of the screen displayed when image formation apparatus 100 reproduces the touch events.

As shown in state (A), in an aspect, touch panel 110 displays a screen for accepting an operation for copying. The user touches a software key 1210 with finger 510 (a touch operation). This touch operation is stored in touch event storage unit 161 as a touch event (press), together with coordinate values of a point where the touch is detected and a predetermined time. The coordinate values may be measured, for example, by defining an endpoint at the upper left of touch panel 110 as the origin (0, 0).

As shown in state (B), when the user lifts finger 510 off software key 1210, the operation is stored in touch event storage unit 161 as a touch event (release), together with the coordinate values of the point where the touch is detected and a predetermined time.

As shown in state (C), when user touches a software key 1220 with finger 510, the operation is stored in touch event storage unit 161 as a touch event (press).

As shown in state (D), in another aspect, image formation apparatus 100 accepts an instruction to reproduce the touch events from the user (for example, a salesperson who provides an explanation of image formation apparatus 100). In response to the instruction, touch panel 110 reads out the data from region 910 of touch event storage unit 161, and displays a message 1230. Message 1230 indicates generation of the touch event (press) saved as shown in state (A). On this occasion, touch panel 110 may display a mark indicating that the touch has been performed at software key 1210. This mark is, for example, a circular figure as shown in state (D), and any other figure, character, symbol, or the like may be displayed. Further, in another aspect, the color of software key 1210 may be changed. Furthermore, in still another aspect, software key 1210 may blink.

As shown in state (E), thereafter, touch panel 110 reproduces the touch event (release). Specifically, touch panel 110 displays a message 1240 based on the data in region 920. On this occasion, as in the case of state (D), touch panel 110 may display a mark indicating that the touch has been performed at software key 1210. This mark is, for example, a circular figure as shown in state (E), and any other figure, character, symbol, or the like may be displayed. Further, in another aspect, the color of software key 1210 may be changed. Furthermore, in still another aspect, software key 1210 may blink.

As shown in state (F), touch panel 110 reproduces the touch event (press). Specifically, touch panel 110 displays a message 1250 based on the data in region 930. On this occasion, as in the case of state (D), touch panel 110 may display a mark indicating that the touch has been performed at software key 1220. This mark is, for example, a circular figure as shown in state (F), and any other figure, character, symbol, or the like may be displayed. Further, in another aspect, the color of software key 1220 may be changed. Furthermore, in still another aspect, software key 1220 may blink.

[Storage of Flick Operation]

Figure 13:
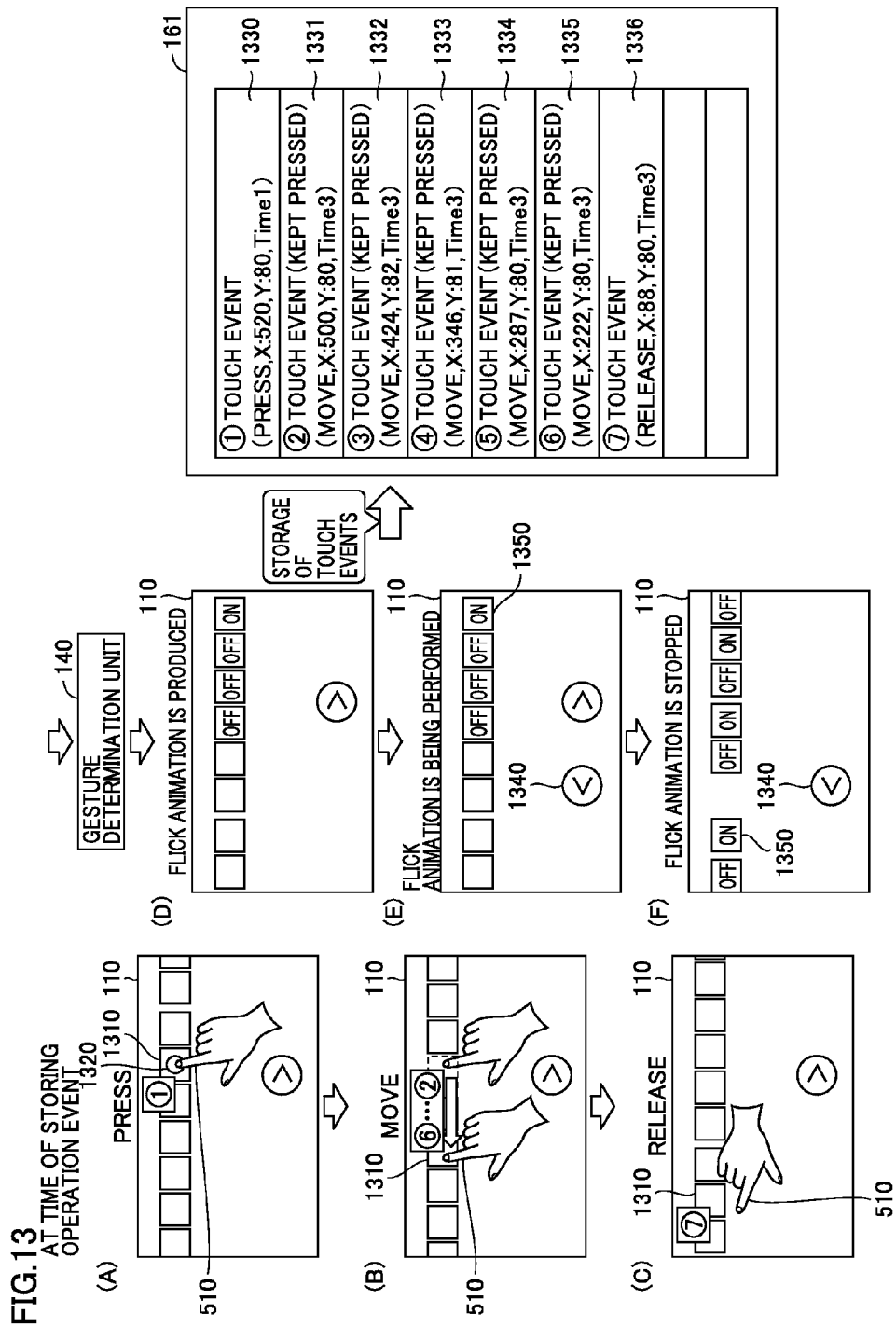
FIG. 13 is a view showing transition of the screen of touch panel 110 in a case where image formation apparatus 100 in accordance with the embodiment of the present invention stores a flick operation.

Referring to FIG. 13, storage and reproduction of a flick operation will be described. FIG. 13 is a view showing transition of the screen of touch panel 110 in a case where image formation apparatus 100 in accordance with the embodiment of the present invention stores a flick operation.

States (A) to (C) show transition of the screen of touch panel 110 in a case where image formation apparatus 100 stores touch events of a flick operation in response to an operation by the user. States (D) to (F) each show a result of gesture determination by gesture determination unit 140 and the state of data storage into touch event storage unit 161.

As shown in state (A), in an aspect, the user performs a menu operation to switch the operational mode of image formation apparatus 100 to the mode for storing a touch operation. The user touches a software key 1310 with finger 510 (a press).

As shown in state (B), the user moves the right hand leftward with finger 510 pressing the screen. On this occasion, for example, five touch events are recognized. Data indicating these events is stored in regions 1331 to 1335 of touch event storage unit 161.

As shown in state (C), when the user lifts finger 510 off touch panel 110, the operation is recognized as a touch event (release), and stored in a region 1336 of touch event storage unit 161.

Thereafter, based on an output from touch panel 110, gesture determination unit 140 determines the contents of the touch events, and stores corresponding data in touch event storage unit 161.

More specifically, as shown in state (D), gesture determination unit 140 detects that a flick operation has been performed, based on the output from touch panel 110. Gesture determination unit 140 specifies a gesture corresponding to the flick operation, as a gesture to be performed by image formation apparatus 100. When the gesture is specified, an animation showing the gesture is produced. Data corresponding to the operation shown in the screen in state (A) is stored in a region 1330, as a touch event (press), together with coordinate values of a point where the operation is detected and a predetermined time.

Further, as shown in state (E), gesture determination unit 140 recognizes that, on touch panel 110, the screen is scrolled to the left, with an arrow 1340, which indicates that the screen is moving leftward, being displayed. On this occasion, data corresponding to the operation shown in the screen in state (B) is stored in regions 1331 to 1335, as touch events (moves), together with coordinate values of points where the operation is detected and predetermined times.

When the screen is scrolled by a data amount stored in touch event storage unit 161, the animation of the flick gesture is stopped as shown in state (F).

[At Time of Reproducing Operation Event]

Figure 14:
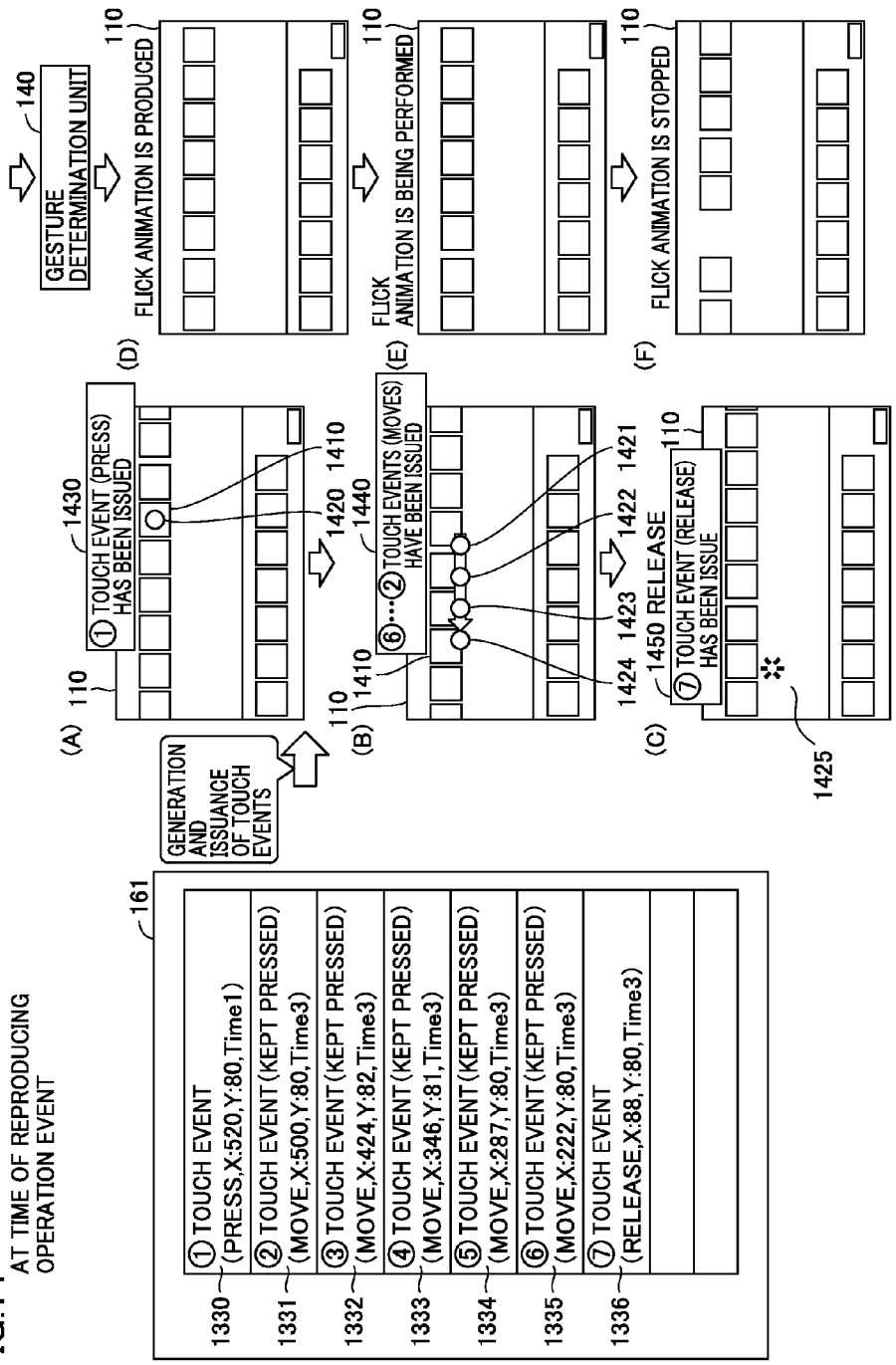
FIG. 14 is a view showing transition of the screen in a case where touch panel 110 of image formation apparatus 100 in accordance with the embodiment of the present invention reproduces an operation event.

Referring to FIG. 14, reproduction of an operation event will be described. FIG. 14 is a view showing transition of the screen in a case where touch panel 110 of image formation apparatus 100 in accordance with the embodiment of the present invention reproduces an operation event.

In an aspect, image formation apparatus 100 stores data in touch event storage unit 16, in response to processing as shown in FIG. 13. When image formation apparatus 100 accepts, from the user, an instruction to reproduce an animation showing a gesture corresponding to a touch operation, image formation apparatus 100 starts reproduction of the animation, with reference to the data stored in touch event storage unit 161.

More specifically, as shown in a screen (A), touch panel 110 displays a mark 1420 indicating that the touch operation has been performed at a software key 1410. Mark 1420 corresponds to the tip of a finger of the user. The manner of this display is not limited to a circular mark, and any other shape or symbol may be used. Further, mark 1420 may blink. Furthermore, in another aspect, the color of mark 1420 may be different from the color of other regions of touch panel 110. Touch panel 110 further displays a message 1430 indicating that a touch event has been issued.

Thereafter, as shown in a screen (B), touch panel 110 displays transition of the screen corresponding to moves, as touch events. For example, touch panel 110 sequentially displays marks 1421, 1422, 1423, 1424 in order to indicate that mark 1420 displayed on screen (A) is moving. Thereby, a person looking at touch panel 110 (for example, a potential customer looking at a demonstration screen) can easily recognize that an operation for scrolling the screen from the right to the left is performed. Further, in another aspect, touch panel 110 may display a message 1440 indicating that the touch events (moves) have been issued.

A screen (C) is a screen which shows a state where the user lifts the finger off touch panel 110 at the end of the flick operation. Touch panel 110 displays a mark 1425 indicating that the user lifts the finger off the screen. Thereby, the person looking at touch panel 110 (for example, the potential customer looking at the demonstration screen) can easily recognize that the flick operation is finished. Further, in another aspect, touch panel 110 may display a message 1450 indicating that a touch event (release) has been issued.

[Pinch Operation]

Figure 15:
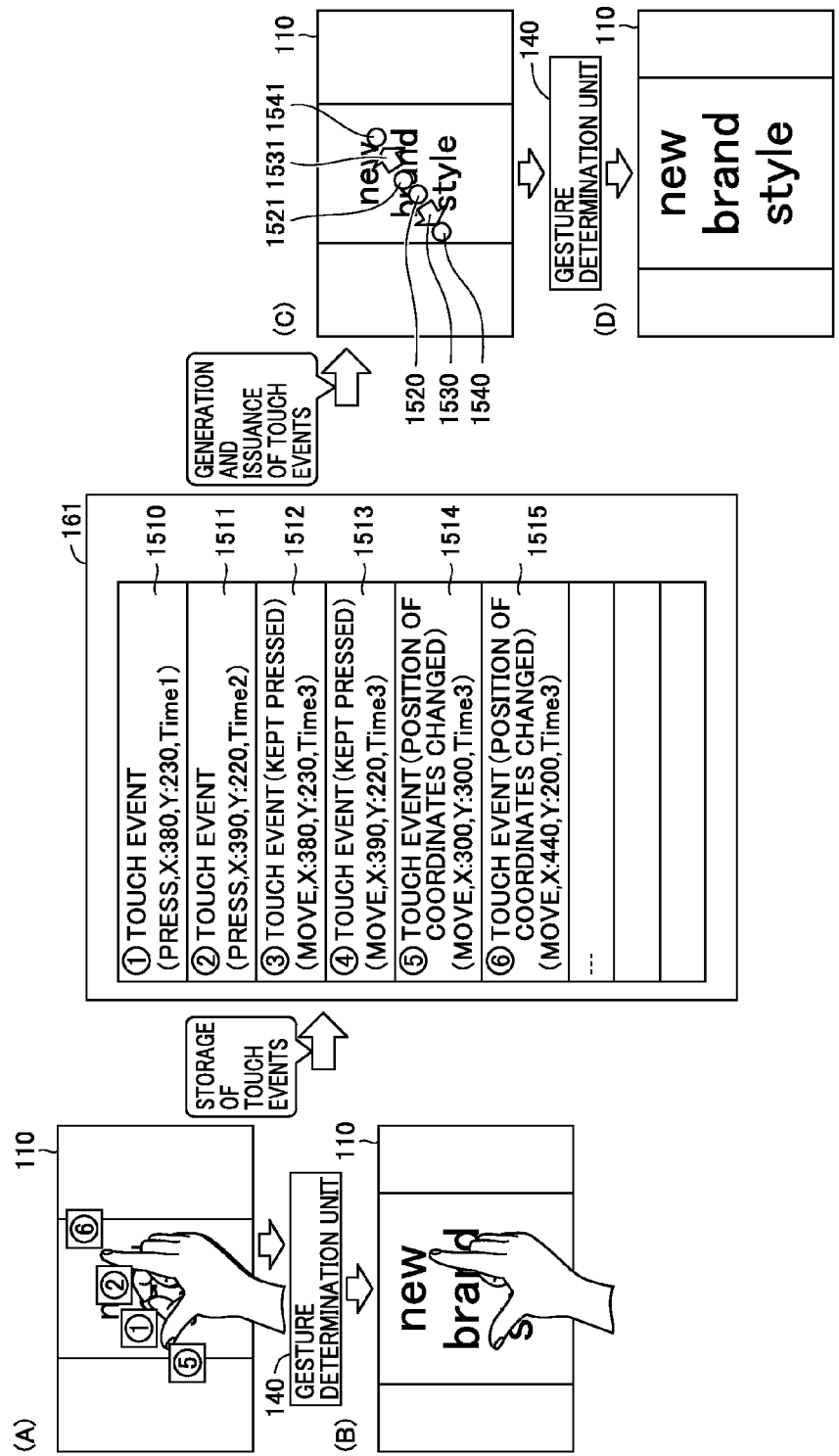
FIG. 15 is a view showing a pinch operation and a gesture on touch panel 110 of image formation apparatus 100 in accordance with the embodiment of the present invention.

Referring to FIG. 15, storage and reproduction of a pinch operation will be described. FIG. 15 is a view showing a pinch operation on touch panel 110 of image formation apparatus 100 in accordance with the embodiment of the present invention, and a gesture based on the pinch operation.

Referring to a screen (A), in an aspect, when the operational mode of touch panel 110 is set to a mode for accepting a pinch operation, the user performs an operation of pressing the thumb and the forefinger against touch panel 110 and spreading a distance between the thumb and the forefinger, in order to perform a pinch operation. Touch panel 110 outputs a signal in accordance with such an operation to touch event accepting unit 120. Touch event accepting unit 120 changes the format of the signal to the format in accordance with processing by gesture determination unit 140, and thereafter outputs the changed signal to gesture determination unit 140.

Based on the signal, gesture determination unit 140 detects that the operation on touch panel 110 is a pinch operation. In gesture determination unit 140, pinch recognizer 740 generates data indicating a touch operation (pinch), and stores the data in touch event storage unit 161. The data is stored, for example, in regions 1510 to 1515.

More specifically, data indicating that the thumb has touched touch panel 110 is stored in region 1510. Data indicating that the forefinger has touched touch panel 110 is stored in region 1511. Data indicating a state where the thumb is kept pressed against touch panel 110 is stored in region 1512. Data indicating a state where the forefinger is kept pressed against touch panel 110 is stored in region 1513. Data indicating a move operation of the thumb is stored in region 1514. Data indicating a move operation of the forefinger is stored in region 1515.

In this manner, after accepting an input of a pinch operation, image formation apparatus 100 can accept an instruction to reproduce the pinch operation, that is, an instruction to reproduce a gesture. When such an instruction is given to image formation apparatus 100, touch panel 110 starts displaying the gesture.

More specifically, as shown in a screen (C), touch panel 110 displays an image. This image is, for example, an image used when the pinch operation is input on screen (A). However, the image is not limited to such an image, and any other image may be used. In another aspect, the other image may be displayed on touch panel 110, based on other image data stored in the storage device of image formation apparatus 100 (for example, RAM 203, USB memory 221, hard disk 340, or the like).

When touch panel 110 performs an operation corresponding to the pinch operation, an enlarged image is displayed as shown in a screen (D).

[Import or Export of Touch Event]

Figure 16:
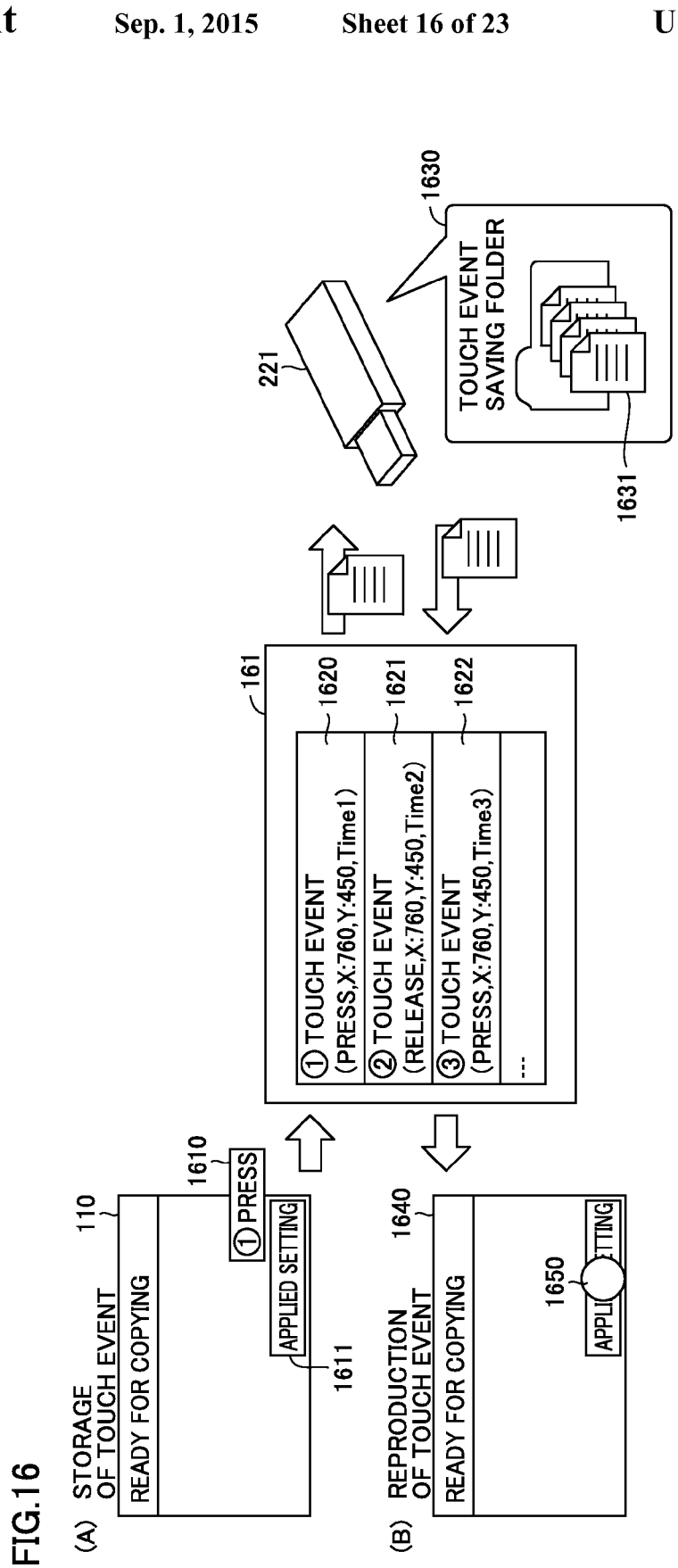
FIG. 16 is a view showing import and export of a touch event in image formation apparatus 100 in accordance with the embodiment of the present invention.

Referring to FIG. 16, import and export of a touch event will be described. FIG. 16 is a view showing import and export of a touch event in image formation apparatus 100 in accordance with the embodiment of the present invention. In an aspect, a touch event generated in image formation apparatus 100 may also be used in other image formation apparatuses and other information processing apparatuses having the same function.

In FIG. 16, a screen (A) is a screen on which an operation for storing a touch event in image formation apparatus 100 is performed. In an aspect, when the operational mode of image formation apparatus 100 is set to the mode for storing a touch event, the user touches a software key 1611 and thereby can store a touch event (press) corresponding to the touch operation in image formation apparatus 100. On this occasion, touch event storage unit 161 stores data indicating the touch operation.

More specifically, a region 1620 stores that the touch event (press) is performed at coordinate values (760, 450) at certain timing (Time 1). It is noted that, although the timing is, for example, a time that has elapsed since the start of the mode for storing, the starting point of the time is not limited to the time when the mode for storing is started. When image formation apparatus 100 has a built-in clock, a time measured by the clock may be used as the timing.

It is noted that, in another aspect, touch panel 110 may display a message 1610 indicating that the touch event has been performed. Since the user can check what type of touch event is recognized by image formation apparatus 100 from the message, the message can prevent an incorrect touch operation from being recognized.

Also when any other operation is performed, touch event storage unit 161 stores data corresponding to the operation. For example, a region 1621 stores that a touch event (release) is performed, coordinate values of a point where the touch event is performed, and timing at which the touch event is performed. A region 1622 holds the same type of data for a touch event (press).

Image formation apparatus 100 in accordance with an aspect can export data stored in touch event storage unit 161 to an external, removable storage device. When image formation apparatus 100 exports data, image formation apparatus 100 converts data stored in touch event storage unit 161 or any other memory region into an arbitrary file format (for example, a csv file), and thereafter saves the converted file in USB memory 221.

In the example of FIG. 16, image formation apparatus 100 can export the data saved in regions 1620 to 1622 to USB memory 221. When USB memory 221 is connected to such image formation apparatus 100, USB memory 221 generates a touch event saving folder 1630. Touch event saving folder 1630 saves data corresponding to the data stored in regions 1620 to 1622 in a touch event saving file 1631. Thereafter, USB memory 221 is connected to another information processing apparatus.

A screen (B) is a screen of a touch panel 1640 included in the other information processing apparatus which has the same function as that of image formation apparatus 100. That is, in a case where the operational mode of the other information processing apparatus is set to a mode for reproducing a touch event, when USB memory 221 is inserted in the other information processing apparatus, touch event saving file 1631 is read out from USB memory 221 to touch event storage unit 161 of the other information processing apparatus. When the format of the read-out data is a csv format or any other format, the other information processing apparatus converts the format of the data into a recognizable data format.

Touch panel 1640 displays a mark 1650 indicating that the touch event (press) has been performed, based on the data included in touch event saving file 1631 (for example, the data stored in region 1620). In this manner, the touch event issued in image formation apparatus 100 can be imported to the other information processing apparatus, and the other information processing apparatus can import the touch event from image formation apparatus 100. The other information processing apparatus having the same function as that of image formation apparatus 100, i.e., having the function of reproducing a touch event, can reproduce the touch event registered in image formation apparatus 100, based on the imported data. Therefore, for example, the content of a touch event set in image formation apparatus 100 at a location can also be reproduced in another information processing apparatus at another location which is away from that location.

[Addition of Information to Gesture]

Figure 17:
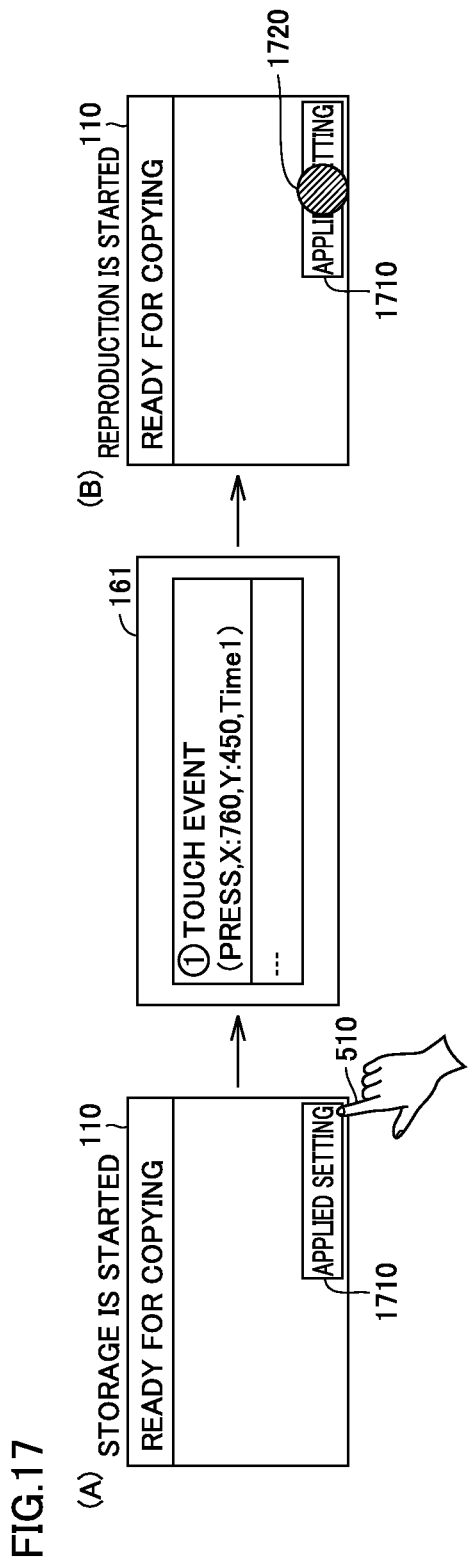
FIG. 17 is a view showing an aspect in which information is added to a gesture displayed on touch panel 110 included in image formation apparatus 100.

Referring to FIG. 17, addition of information to a touch event will be described. FIG. 17 is a view showing an aspect in which information is added to a gesture displayed on touch panel 110 included in image formation apparatus 100.

As shown in a screen (A), touch panel 110 accepts a touch operation to a software key 1710 performed with finger 510 of the user. Touch event storage unit 161 saves data indicating the touch operation as a touch event (press).

As shown in a screen (B), when the touch event is thereafter reproduced in image formation apparatus 100 or another information processing apparatus having the same function, touch panel 110 displays a mark 1720 indicating that the touch operation has been performed with the finger of the user. On this occasion, the color of mark 1720 is different from the color used in the screen of touch panel 110. Thereby, the user looking at the screen of touch panel 110 can easily recognize mark 1720, and thus the user can easily understand the content of a gesture. It is noted that the information added to the touch event is not limited to a color. For example, mark 1720 may blink. In this case, operational information for blinking mark 1720 is added to the touch event as an instruction. Also in this case, the user can easily understand the content of the gesture on touch panel 110.

It is noted that timing at which the information as described above is added to mark 1720 may be either when the touch event is registered or when the touch event is reproduced. In a case where the information is added when the touch event is registered, touch event storage unit 161 holds the information associated with the touch event. In a case where the information is added when the touch event is reproduced, image formation apparatus 100 may be configured to accept a setting for adding such information to the touch event (i.e., setting to add or not to add such information), as one of setting items for the mode for reproducing the touch event.

[Addition of Trajectory Information]

Figure 18:
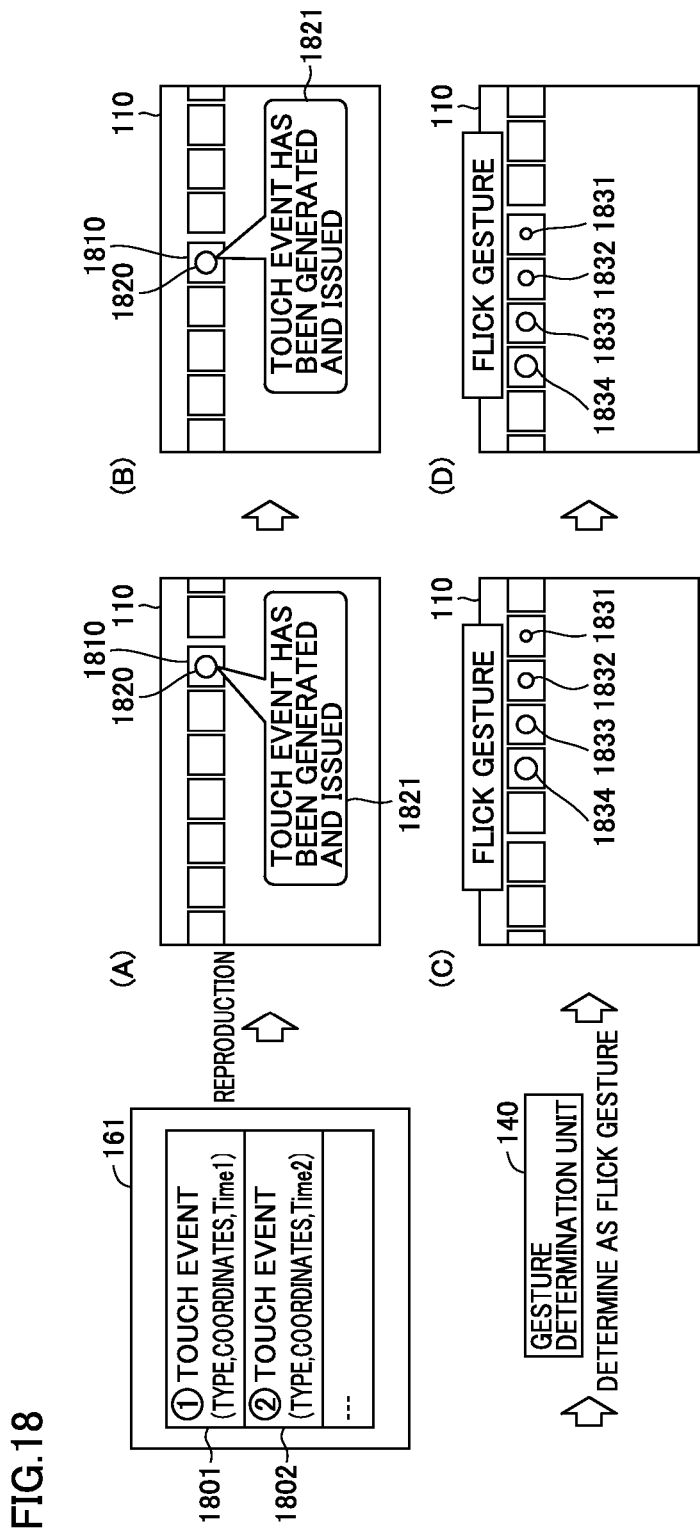
FIG. 18 is a view showing that a trajectory is added when image formation apparatus 100 reproduces a flick gesture.

Referring to FIG. 18, the addition of information to a touch event will be further described. FIG. 18 is a view showing that a trajectory is added when image formation apparatus 100 reproduces a flick gesture.

In an aspect, touch event storage unit 161 holds information indicating touch events in regions 1801, 1802, and the like. When image formation apparatus 100 accepts an input of an instruction to reproduce a flick gesture, touch panel 110 displays a mark 1820 indicating that a touch operation has been performed at a software key 1810, as shown in a screen (A). In another aspect, a message 1821 indicating that a touch event has been generated and issued may be displayed, for more detailed explanation.

As shown in a screen (B), touch panel 110 displays an image showing that software key 1810 and mark 1820 are scrolled to the left. At this time, the user of image formation apparatus 100 can recognize that the touch event has been registered in image formation apparatus 100. When image formation apparatus 100 enters the mode for reproducing the touch event, gesture determination unit 140 recognizes the flick gesture as a gesture to be performed, based on regions 1801, 1802 of touch event storage unit 161.

Thereafter, as shown in screens (C) and (D), touch panel 110 reproduces and displays the registered flick gesture. On this occasion, touch panel 110 displays marks 1831, 1832, 1833, 1834. The sizes of the marks are increased in the order of mark 1831, mark 1832, mark 1833, and mark 1834. Thereby, the user can easily understand that the flick gesture has been performed, and the content thereof.

It is noted that, in another aspect, image formation apparatus 100 may display a line connecting marks 1831 to 1834 on touch panel 110. Further, in still another aspect, image formation apparatus 100 may repeatedly display a trajectory corresponding to a gesture operation, until an animation performed when the gesture is generated is finished. The user can recognize the trajectory of a touch event.

[Addition of Information to Pinch Gesture]

Figure 19:
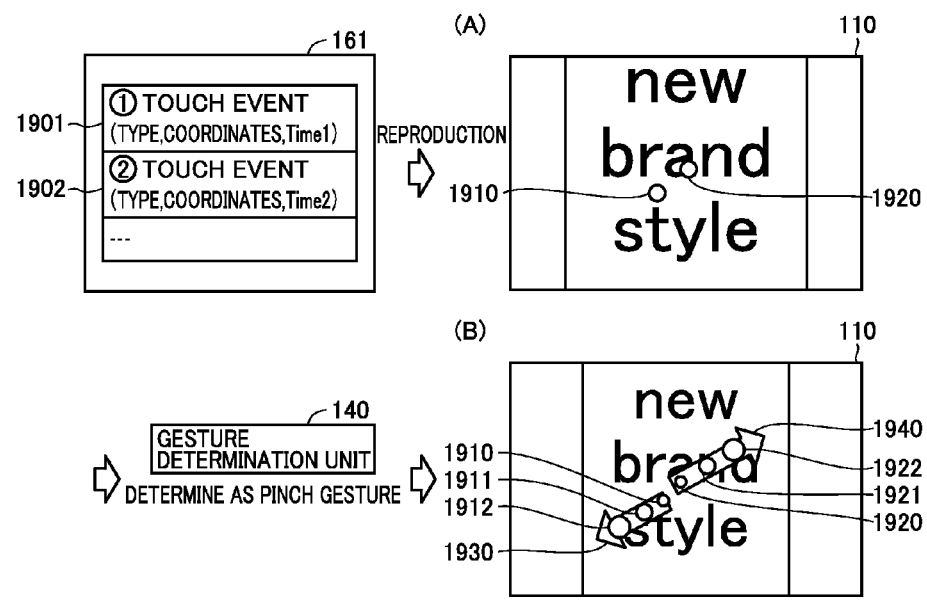
FIG. 19 is a view showing a manner in which trajectories and directions of a pinch gesture are displayed on touch panel 110.

In still another aspect, image formation apparatus 100 may add information to a pinch gesture. Thus, addition of information to a pinch gesture will be described with reference to FIG. 19. FIG. 19 is a view showing a manner in which trajectories and directions of a pinch gesture are displayed on touch panel 110. In an aspect, touch event storage unit 161 stores data indicating a pinch gesture in regions 1901, 1902.

As shown in a screen (A), touch panel 110 displays marks 1910, 1920 indicating that the user touches touch panel 110 with two fingers. Thereafter, the user performs a pinch-out operation. Gesture determination unit 140 detects that a pinch gesture has been performed.

Thereafter, as shown in a screen (B), touch panel 110 displays the pinch gesture, and trajectories and directions of the pinch gesture, based on the data stored in touch event storage unit 161. More specifically, touch panel 110 displays a plurality of marks indicating that the pinch gesture has been performed, that is, marks 1910, 1911, and 1912 and marks 1920, 1921, and 1922. Further, touch panel 110 displays outward arrows 1930, 1940. From such display, the user can easily understand that the pinch gesture has been performed.

It is noted that the manner of displaying each mark is not limited to that described above. In another aspect, a color may be added to each mark, and further, each mark may be displayed in a blinking manner instead of being displayed continuously.

[Addition of Information to Pinch Gesture (Rotation)]

Figure 20:
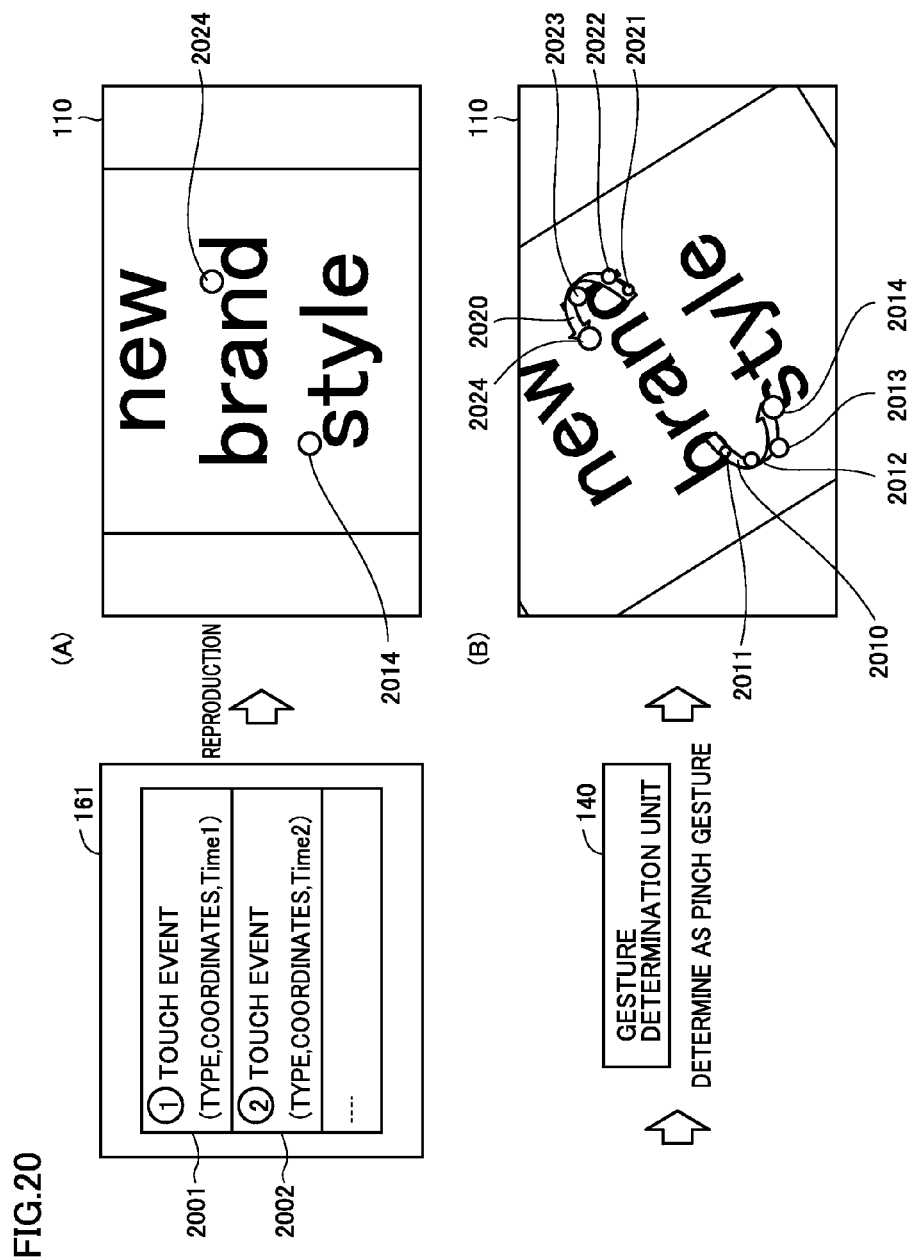
FIG. 20 is a view showing a manner in which information is added when an operation of rotating an image is performed on touch panel 110.

In still another aspect, when an image displayed on touch panel 110 is rotated, image formation apparatus 100 may add information to the image. Then, addition of information in a case where rotation is performed as a pinch gesture will be described with reference to FIG. 20. FIG. 20 is a view showing a manner in which information is added when an operation of rotating an image is performed on touch panel 110.

In an aspect, touch event storage unit 161 stores data indicating touch events registered by the user of image formation apparatus 100, in regions 2001, 2002. Thereafter, when the mode for reproducing a touch event is started, touch panel 110 displays a screen for reproducing a touch event.

More specifically, as shown in a screen (A), touch panel 110 displays two marks 2014, 2024 indicating points where the fingers have been released from touch panel 110 when a pinch gesture (rotation) has been performed on the screen. Gesture determination unit 140 recognizes that the pinch gesture (rotation) has been performed, based on the data stored in touch event storage unit 161.

Thereafter, as shown in a screen (B), touch panel 110 displays an image resulting from rotating the image shown in screen (A). Further, touch panel 110 displays marks 2011, 2012, and 2013 and marks 2021, 2022, and 2023, in addition to marks 2014, 2024, as marks indicating that the pinch gesture (rotation) has been performed. Furthermore, touch panel 110 displays arc-shaped arrows 2010, 2020. Thereby, the user looking at screen (B) can easily recognize that a touch operation for rotating the image has been performed.

It is noted that the manner of displaying each mark is not limited to that described above. In another aspect, a color may be added to each mark, and further, each mark may be displayed in a blinking manner instead of being displayed continuously.

[Change of Size of Region to Which Information is Added]

As described with reference to FIG. 16, in an aspect, image formation apparatus 100 in accordance with the embodiment of the present invention can export data indicating a touch event, and another information processing apparatus can import the data. In this case, there may be a difference between the size of touch panel 110 of image formation apparatus 100 and the size of the touch panel of the other information processing apparatus.

Figure 21:
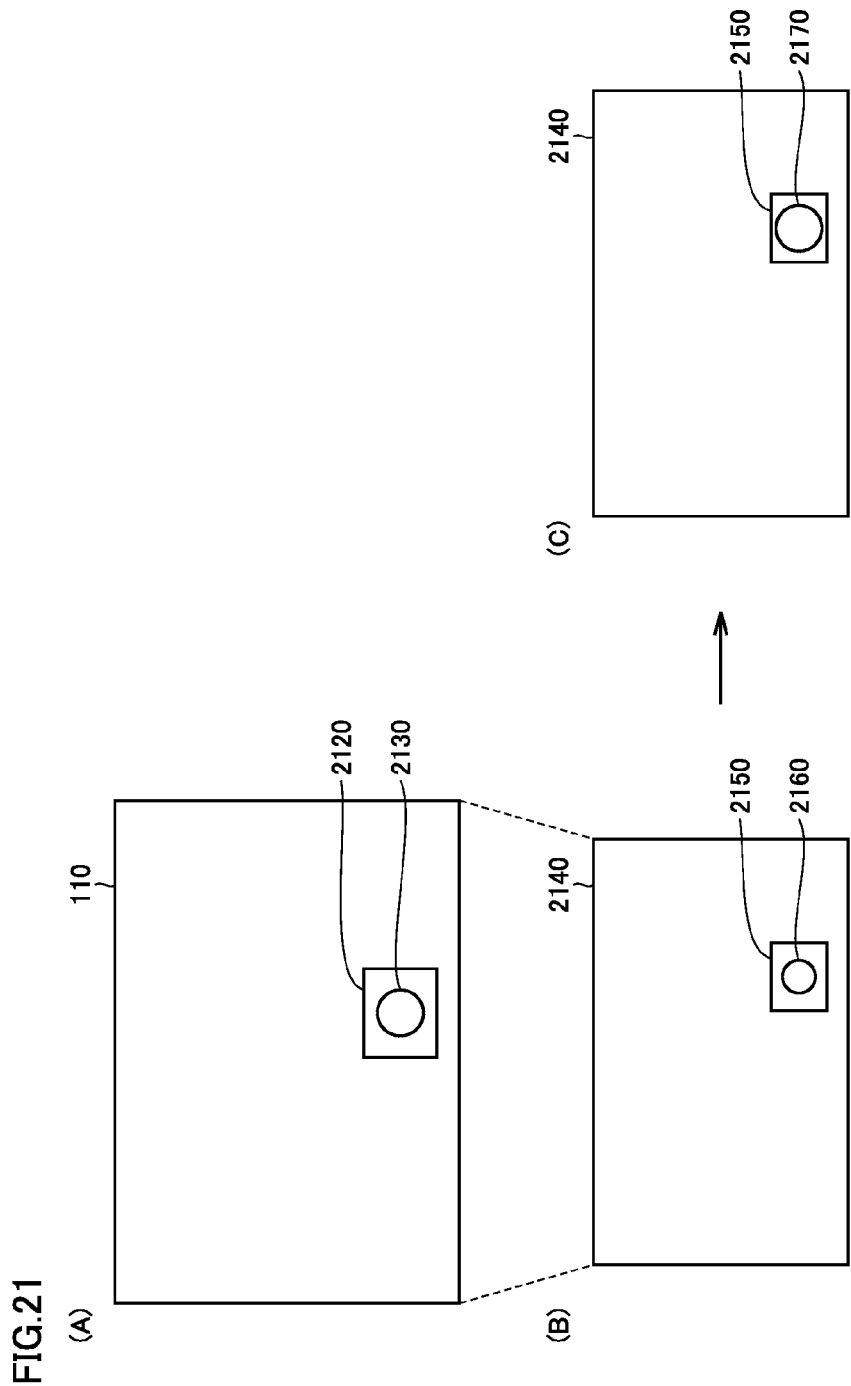
FIG. 21 is a view showing a manner of displaying an image in a case where there is a difference between the size of touch panel 110 of image formation apparatus 100 in which a touch event has been registered and the size of a touch panel of an information processing apparatus in which the touch event is reproduced.

Thus, a description will be given of a case where the sizes of the display regions of the touch panels are different between when a touch event is registered and when it is reproduced, with reference to FIG. 21. FIG. 21 is a view showing a manner of displaying an image in a case where there is a difference between the size of touch panel 110 of image formation apparatus 100 in which a touch event has been registered and the size of a touch panel of an information processing apparatus in which the touch event is reproduced.

A state (A) shows a state where a software key 2120 and a mark 2130 indicating a touch event are displayed on touch panel 110 included in image formation apparatus 100. A state (B) shows a state where a software key 2150 and a mark 2160 indicating the touch event are displayed on a touch panel 2140 included in another information processing apparatus.

As shown in states (A) and (B), there may a difference between the size of touch panel 110 and the size of touch panel 2140. In such a case, the information processing apparatus including touch panel 2140 generally displays software key 2150 and mark 2160 on touch panel 2140, in accordance with the ratio between the size of touch panel 110 and the size of touch panel 2140. Therefore, when touch panel 2140 is smaller than touch panel 110, software key 2150 and mark 2160 displayed on touch panel 2140 are smaller than software key 2120 and mark 2130 displayed on touch panel 110.

However, as shown in a state (C), in an aspect, the other information processing apparatus may display a mark 2170 bigger than mark 2160, as a mark indicating that the touch event has been performed. Although the ratio between software key 2150 and mark 2170 differs from the ratio between software key 2120 and mark 2130 in this case, the user can easily identify mark 2170, as mark 2170 is not displayed in a small size. Accordingly, the user can easily understand that the touch event has been performed.

[Control Structure]

Figure 22:
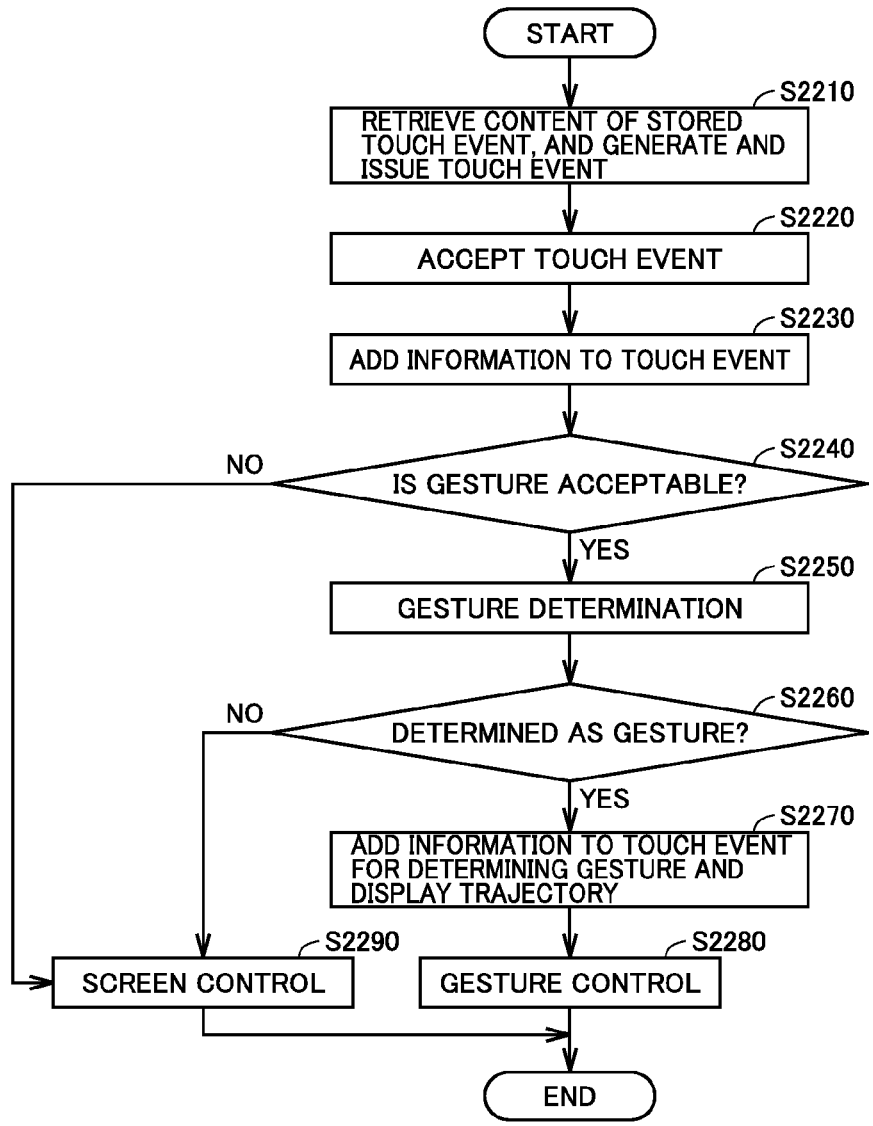
FIG. 22 is a flowchart illustrating a portion of processing performed by image formation apparatus 100.
Figure 23:
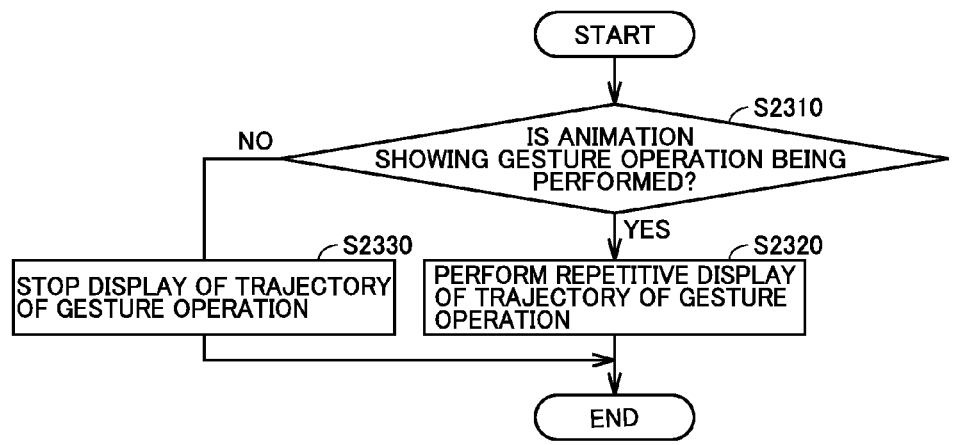
FIG. 23 is a flowchart illustrating processing for displaying a gesture when image formation apparatus 100 is performing an animation.

Referring to FIGS. 22 and 23, a control structure of image formation apparatus 100 will be described. FIG. 22 is a flowchart illustrating a portion of processing performed by image formation apparatus 100.

In step S2210, MFP main body system control unit 200 retrieves the content of a touch event stored in RAM 203 or any other storage device, and generates and issues the touch event.

In step S2220, MFP main body system control unit 200 accepts an input of a touch event.

In step S2230, MFP main body system control unit 200 adds information to the touch event. The information is used to change the manner of displaying a mark indicating the touch event. When the information is added to the touch event, the color of the mark is changed to a color different from the color of the rest of the screen of touch panel 110. In another aspect, a trajectory indicating a gesture is displayed on touch panel 110, together with the mark.

In step S2240, MFP main body system control unit 200 determines whether or not the gesture is acceptable, based on an operation given to LCD panel unit 206 or hardware key operation unit 208. This determination is made, for example, based on the content of a signal output from LCD panel unit 206 or hardware key operation unit 208 in response to the operation.

As an example, in a case where the user performs a touch operation on LCD panel unit 206, when the operational mode of image formation apparatus 100 at that time is set to a mode for accepting a gesture operation, MFP main body system control unit 200 determines that the gesture operation is acceptable. When the operational mode of image formation apparatus 100 is set to a mode for not accepting a gesture operation, for example, when a screen for accepting an input of the number of copies is displayed, MTP main body system control unit 200 determines that the gesture is not acceptable.

As another example, when the user performs an operation on hardware key operation unit 208, a signal output from hardware key operation unit 208 includes information indicating that the operation has been performed on hardware key operation unit 208. Therefore, in this case, MFP main body system control unit 200 determines that the gesture is not acceptable.

When MFP main body system control unit 200 determines that the gesture is acceptable (YES in step S2240), MFP main body system control unit 200 switches control to step S2250. Otherwise (NO in step S2240), MFP main body system control unit 200 switches control to step S2290.

In step S2250, based on a signal output from panel CPU 201, MFP main body system control unit 200 determines whether or not the operation given to touch panel 110 is a gesture operation, and, when the operation is a gesture operation, MFP main body system control unit 200 determines the type of the gesture.

When MFP main body system control unit 200 determines in step S2260 that the operation is a gesture (YES in step S2260), MFP main body system control unit 200 switches control to step S2270. Otherwise (NO in step S2260), MFP main body system control unit 200 switches control to step S2290.

In step S2270, MFP main body system control unit 200 adds information to the touch event for determining a gesture and causes a trajectory of the gesture to be displayed on LCD panel unit 206, via LCD control unit 204.

In step S2280, MFP main body system control unit 200 performs gesture control via LCD control unit 204. LCD panel unit 206 performs reproduction and display of the gesture based on the touch event registered in image formation apparatus 100.

In step S2290, MFP main body system control unit 200 performs usual screen control via LCD control unit 204. LCD panel unit 206 accepts an input of a setting in accordance with an operation by the user, or switches a screen to another screen based on the operation, depending on the operational mode of image formation apparatus 100.

Referring to FIG. 23, a control structure in another aspect of image formation apparatus 100 will be described. FIG. 23 is a flowchart illustrating processing for displaying a gesture when image formation apparatus 100 is performing an animation.

In step S2310, MTP main body system control unit 200 determines whether or not image formation apparatus 100 is performing an animation showing a gesture operation. This determination is made, for example, based on data indicating the operational mode of image formation apparatus 100. When MFP main body system control unit 200 determines that image formation apparatus 100 is performing the animation (YES in step S2310), MFP main body system control unit 200 switches control to step S2320. Otherwise (NO in step S2310), MFP main body system control unit 200 switches control to step S2330.

In step S2320, MFP main body system control unit 200 performs repetitive display of a trajectory of the gesture operation. Thereby, the user of image formation apparatus 100 can reliably visually recognize the trajectory indicating the gesture operation on LCD panel unit 206.

In step S2330, MFP main body system control unit 200 stops the display of the trajectory of the gesture operation.

CONCLUSION

As described above, image formation apparatus 100 in accordance with the embodiment of the present invention accepts an operation on touch panel 110, and displays an operation based on the above operation as a gesture of image formation apparatus 100. On this occasion, image formation apparatus 100 displays additional information on the gesture. Thereby, the content of the operation using touch panel 110 of image formation apparatus 100 is easily understood.

Although the embodiment of the present invention has been described, it should be understood that the embodiment disclosed herein is illustrative and non-restrictive in every respect. The scope of the present invention is defined by the scope of the claims, and is intended to include any modifications within the scope and meaning equivalent to the scope of the claims.

What is claimed is:

1. An information processing apparatus, comprising:
   a display unit configured to display a screen which accepts a touch operation on said information processing apparatus;
   a touch operation unit configured to accept said touch operation;
   a touch event issuance unit configured to issue one or more touch events respectively corresponding to one or more touch operations on said touch operation unit; and
   a gesture control unit configured to be capable of performing each of a mode for performing corresponding processing based on said one or more touch events issued by said touch event issuance unit, and a reproduction mode for reproducing said touch event stored beforehand,
   said gesture control unit being configured to add an operation image indicating the touch operation corresponding to said stored touch event, to a region associated with said touch event in said reproduction mode, and to cause said display unit to display the operation image.

2. The information processing apparatus according to claim 1, wherein
   said touch operation unit is configured to accept a series of touch operations,
   said information processing apparatus further comprises a determination unit configured to determine whether or not said series of touch operations correspond to an operation for implementing a function of said information processing apparatus, and when said series of touch operations correspond to the operation for implementing the function of said information processing apparatus, said gesture control unit is configured to cause said display unit to display said one or more touch events and information indicating that a touch operation has been performed on the information processing apparatus.

3. The information processing apparatus according to claim 1, further comprising an acquisition unit configured to acquire data from an external apparatus external to said information processing apparatus, wherein said touch event issuance unit is configured to issue said one or more touch events based on the data acquired from said external apparatus.

4. The information processing apparatus according to claim 3, wherein said external apparatus includes an information communication terminal having a touch panel, and said information processing apparatus further comprises a correction unit configured to correct a sampling number in said information communication terminal to a sampling number in said information processing apparatus.

5. The information processing apparatus according to claim 1, wherein said touch event issuance unit includes a storage unit configured to store a time that has elapsed from predefined timing to timing at which each of said one or more touch operations is performed, and the touch operation, in an associated manner, and said information processing apparatus further comprises a reproduction unit configured to cause said information processing apparatus to perform an operation corresponding to said one or more touch operations, for each of said one or more touch operations, based on said time and the touch operation.

6. The information processing apparatus according to claim 1, wherein said gesture control unit is configured to repeatedly display said one or more touch operations or information indicating that a touch operation has been performed on the information processing apparatus.

7. The information processing apparatus according to claim 1, wherein information indicating that a touch operation has been performed on the information processing apparatus is transferable between said information processing apparatus and another information processing apparatus, and a region in which said information is displayed is configured to be changed in accordance with a size of a display region of the display unit included in the information processing apparatus which displays the information.

8. The information processing apparatus according to claim 1, wherein the touch operation on said information processing apparatus includes a flick operation, and said display unit is configured to display a trajectory of said flick operation when said flick operation is performed.

9. The information processing apparatus according to claim 1, wherein the touch operation on said information processing apparatus includes a two-point touch operation, and said display unit is configured to display, in accordance with a change in coordinate values of points where said two-point touch operation is performed, a direction indicating the change.

10. The information processing apparatus according to claim 1, wherein said gesture control unit is configured to cause said display unit to display said operation image, together with an image indicating a result of said processing by said touch event, in said reproduction mode.

11. A method for controlling an information processing apparatus, comprising:

displaying a screen which accepts a touch operation on said information processing apparatus;

accepting said touch operation;

issuing one or more touch events respectively corresponding to one or more said touch operations; and performing each of a mode for performing corresponding processing based on said issued one or more touch events, and a reproduction mode for reproducing said touch event stored beforehand, said performing including adding an operation image indicating the touch operation corresponding to said stored touch event, to a region associated with said touch event in said reproduction mode, and displaying the operation image.

12. The method according to claim 11, wherein said accepting said touch operation includes accepting a series of touch operations, said method further comprises determining whether or not said series of touch operations correspond to an operation for implementing a function of said information processing apparatus, and when said series of touch operations correspond to the operation for implementing the function of said information processing apparatus, said performing includes displaying said one or more touch events and information indicating that a touch operation has been performed on the information processing apparatus.

13. The method according to claim 11, further comprising acquiring data from an external apparatus external to said information processing apparatus, wherein said issuing said touch event includes issuing said one or more touch events based on the data acquired from said external apparatus.

14. The method according to claim 13, wherein said external apparatus includes an information communication terminal having a touch panel, and said method further comprises correcting a sampling number in said information communication terminal to a sampling number in said information processing apparatus.

15. The method according to claim 11, wherein said issuing said touch event includes storing a time that has elapsed from predefined timing to timing at which each of said one or more touch operations is performed, and the touch operation, in an associated manner, and said method further comprises causing said information processing apparatus to perform an operation corresponding to said one or more touch operations, for each of said one or more touch operations, based on said time and the touch operation.

16. The method according to claim 11, wherein said performing includes repeatedly displaying said one or more touch operations or information indicating that a touch operation has been performed on the information processing apparatus.

17. The method according to claim 11, wherein information indicating that a touch operation has been performed on the information processing apparatus is transferable between said information processing apparatus and another information processing apparatus, and a region in which said information is displayed is configured to be changed in accordance with a size of a display region of the display unit included in the information processing apparatus which displays the information.

18. The method according to claim 11, wherein
the touch operation on said information processing apparatus includes a flick operation, and
said displaying includes displaying a trajectory of said flick operation when said flick operation is performed.

19. The method according to claim 11, wherein
the touch operation on said information processing apparatus includes a two-point touch operation, and
said displaying includes displaying, in accordance with a change in coordinate values of points where said two-point touch operation is performed, a direction indicating the change.

20. A non-transitory computer-readable recording medium storing a program for causing a computer to perform a method for controlling an information processing apparatus, said program causing said computer to perform:
 displaying a screen which accepts a touch operation on said information processing apparatus;
 accepting said touch operation;
 issuing one or more touch events respectively corresponding to one or more said touch operations; and
 performing each of a mode for performing corresponding processing based on said issued one or more touch events, and a reproduction mode for reproducing said touch event stored beforehand,
 said performing including adding an operation image indicating the touch operation corresponding to said stored touch event, to a region associated with said touch event in said reproduction mode, and displaying the operation image.

\* \* \* \* \*